United States Patent
Ramachandran et al.

(10) Patent No.: US 12,074,954 B2
(45) Date of Patent: Aug. 27, 2024

(54) GENERATING APPLICATION CONFIGURATIONS BASED ON USER ENGAGEMENT SEGMENTS

(71) Applicant: Apple Inc., Cupertino, CA (US)

(72) Inventors: Balaji Ramachandran, Campbell, CA (US); Jean S. Metz, Sunnyvale, CA (US); Collin D. Ruffenach, Portland, OR (US); Christopher S. Schepman, Portland, OR (US); Guillermo Ortiz, Mountain View, CA (US); Feng Yi, San Jose, CA (US); Casey M. Dougherty, San Francisco, CA (US); Martin J. Murret, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/955,970

(22) Filed: Sep. 29, 2022

(65) Prior Publication Data

US 2023/0022898 A1    Jan. 26, 2023

Related U.S. Application Data

(63) Continuation of application No. 16/427,676, filed on May 31, 2019, now Pat. No. 11,496,592.
(Continued)

(51) Int. Cl.
*H04L 67/50* (2022.01)
*G06F 9/445* (2018.01)
(Continued)

(52) U.S. Cl.
CPC ........ *H04L 67/535* (2022.05); *G06F 9/44505* (2013.01); *G06F 9/451* (2018.02);
(Continued)

(58) Field of Classification Search
CPC .... G06F 9/44505; G06F 9/4451; G06F 9/451; G06F 11/3438; G06F 2201/81;
(Continued)

(56) References Cited

U.S. PATENT DOCUMENTS 9,329,759 B1    5/2016  Hill
9,990,114 B1    6/2018  Horton et al.
(Continued)

*Primary Examiner* — Thomas J Dailey
(74) *Attorney, Agent, or Firm* — Invoke

(57) ABSTRACT

In some implementations, a server device can generate configuration data for an application based on user engagement segments associated with a user of the application. For example, a server device can receive information identifying user engagement segments associated with a particular user. When the server device receives a request for configuration data for the application that identifies the particular user, the server device can obtain the engagement segment identifiers associated with the particular user. The server device can use the engagement segment identifiers to obtain segment configuration data for each engagement segment identifier, combine the segment configuration data into a combined configuration, and send the combined configuration to the application on the user device. The application can then determine what content to present and how to present the content on the user device based on the combined configuration data.

16 Claims, 20 Drawing Sheets

Related U.S. Application Data

(60) Provisional application No. 62/679,962, filed on Jun. 3, 2018.

(51) Int. Cl.
*G06F 9/451* (2018.01)
*G06F 11/34* (2006.01)
*H04L 67/00* (2022.01)
*H04L 67/306* (2022.01)
*H04W 4/50* (2018.01)

(52) U.S. Cl.
CPC ........ *G06F 11/3438* (2013.01); *H04L 67/306* (2013.01); *H04L 67/34* (2013.01); *G06F 9/4451* (2013.01); *G06F 2201/81* (2013.01); *H04W 4/50* (2018.02)

(58) Field of Classification Search
CPC ..... H04L 67/306; H04L 67/34; H04L 67/535; H04W 4/50
See application file for complete search history.

(56) References Cited

U.S. PATENT DOCUMENTS

| | | |
|---|---|---|
| 2012/0036494 A1 | 2/2012 | Gurumohan et al. |
| 2013/0096892 A1 | 4/2013 | Essa et al. |
| 2014/0279038 A1 | 9/2014 | Lombard |
| 2014/0280890 A1 | 9/2014 | Yi et al. |
| 2014/0316941 A1* | 10/2014 | Mekala .............. G06Q 30/0633 |
| | | 705/26.41 |
| 2015/0038171 A1 | 2/2015 | Uilecan et al. |
| 2015/0248423 A1 | 9/2015 | Christolini et al. |
| 2015/0348090 A1 | 12/2015 | Alsina et al. |
| 2016/0078133 A1 | 3/2016 | Santhanam et al. |
| 2016/0316034 A1 | 10/2016 | Herrick et al. |
| 2017/0308518 A1 | 10/2017 | Sjolander et al. |
| 2019/0026491 A1* | 1/2019 | Telford ............... G06F 21/6227 |
| 2019/0215373 A1 | 7/2019 | Mathur et al. |

* cited by examiner

GENERATING APPLICATION CONFIGURATIONS BASED ON USER ENGAGEMENT SEGMENTS

INCORPORATION BY REFERENCE; DISCLAIMER

Each of the following applications are hereby incorporated by reference: application Ser. No. 16/427,676 filed on May 31, 2019; application No. 62/679,962 filed on Jun. 3, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to determining content to present to a user to improve user engagement with an application.

BACKGROUND

Many users use computing devices, software applications, and web browsers to view content (e.g., video, images, textual content, stories, news articles, etc.). The content providers (e.g., news companies, entertainment companies, etc.) often seek to keep users engaged with their content so that the content providers can generate revenue through advertising, subscriptions, or other revenue sources. Typically, the content provided to a particular user is customized for the particular user based on user preferences and/or demographic information associated with the particular user. For example, users can be segmented into different demographic segments (e.g., by age, gender, etc.) and content can be selected and provided to the users based on topics that have been determined to be of interest to the demographic segments to which the users belong. However, selecting and providing content to users based on demographic segment may fail to achieve the user retention and/or engagement results that the content publisher's desire.

SUMMARY

In some implementations, a server device can segment users based on user engagement with an application on a user device. For example, server device can receive user event data from many user devices indicating user activities with respect to the application and/or content presented by the application. The server device can generate user engagement segments based on the received user event data. The server device can generate predictive models for each user engagement segment based on the received user event data. The server device can determine which particular user engagement segments a particular user is associated with based on user event data associated with the particular user and/or the predictions generated by the predictive models. The application on the user device associated with the particular user can then be configured according to the user engagement segments associated with the particular user.

In some implementations, a server device can generate configuration data for an application based on user engagement segments associated with a user of the application. For example, a server device can receive information identifying user engagement segments associated with a particular user. When the server device receives a request for configuration data for the application that identifies the particular user, the server device can obtain the engagement segment identifiers associated with the particular user. The server device can use the engagement segment identifiers to obtain segment configuration data for each engagement segment identifier, combine the segment configuration data into a combined configuration, and send the combined configuration to the application on the user device. The application can then determine what content to present and how to present the content on the user device based on the combined configuration data.

In some implementations, a user device can generate configuration data for an application on the user device using multilevel configuration data. For example, an application on the user device can obtain application level configuration data from a server device. The application level configuration data can be generated based on user engagement segments associated with the user of the user device, for example. The application can obtain publisher level configuration data generated by a content publisher. In response to requesting a content item, the application can receive content level configuration data. The application can combine the application level configuration data, the publisher level configuration data, and/or the content level configuration data to generate dynamic configuration data. The dynamic configuration data can be used by the application to determine, among other things, what content to present to the user of the application on the user device.

Particular implementations provide at least the following advantages. User anonymity and/or privacy can be preserved by using anonymous identifiers for tracking user event data generated by the application. By segmenting the user population according to user engagement, the system can determine which or user behaviors are most indicative of increased and/or decreased user engagement and/or retention. User engagement and retention by the application can be improved by selecting content and/or determining how the content is presented by the application based on user engagement segments determined for a user. By reevaluating user event data and user engagement segments over time, the application configuration and content presented can evolve with the interests and behaviors of the user to keep the user engaged with the application. For example, the type of content and variety of content can be updated over time to keep the user engaged with the application. Thus, the user can easily find content of interest to the user from a single application. Moreover, more precise and efficient testing of configurations (e.g., A/B testing) can be performed by testing and/or experimenting with different application configurations (e.g., content configurations) at the user engagement segment level.

Moreover, by selecting and/or obtaining content that is selected based on user engagement segment, the application can more efficiently determine and present content that is interesting to the user. For example, instead of wasting time and computing resources selecting and/or obtaining content that may or may not be of interest to a particular user, the application can spend time and computing resources (e.g., CPU cycles, network bandwidth, memory resources, etc.) selecting and/or obtaining content that has a higher likelihood of engaging the user. Thus, the user can more efficiently find content that the user is interested in and the user device can avoid wasting time and resources on content that the user is not interested in.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
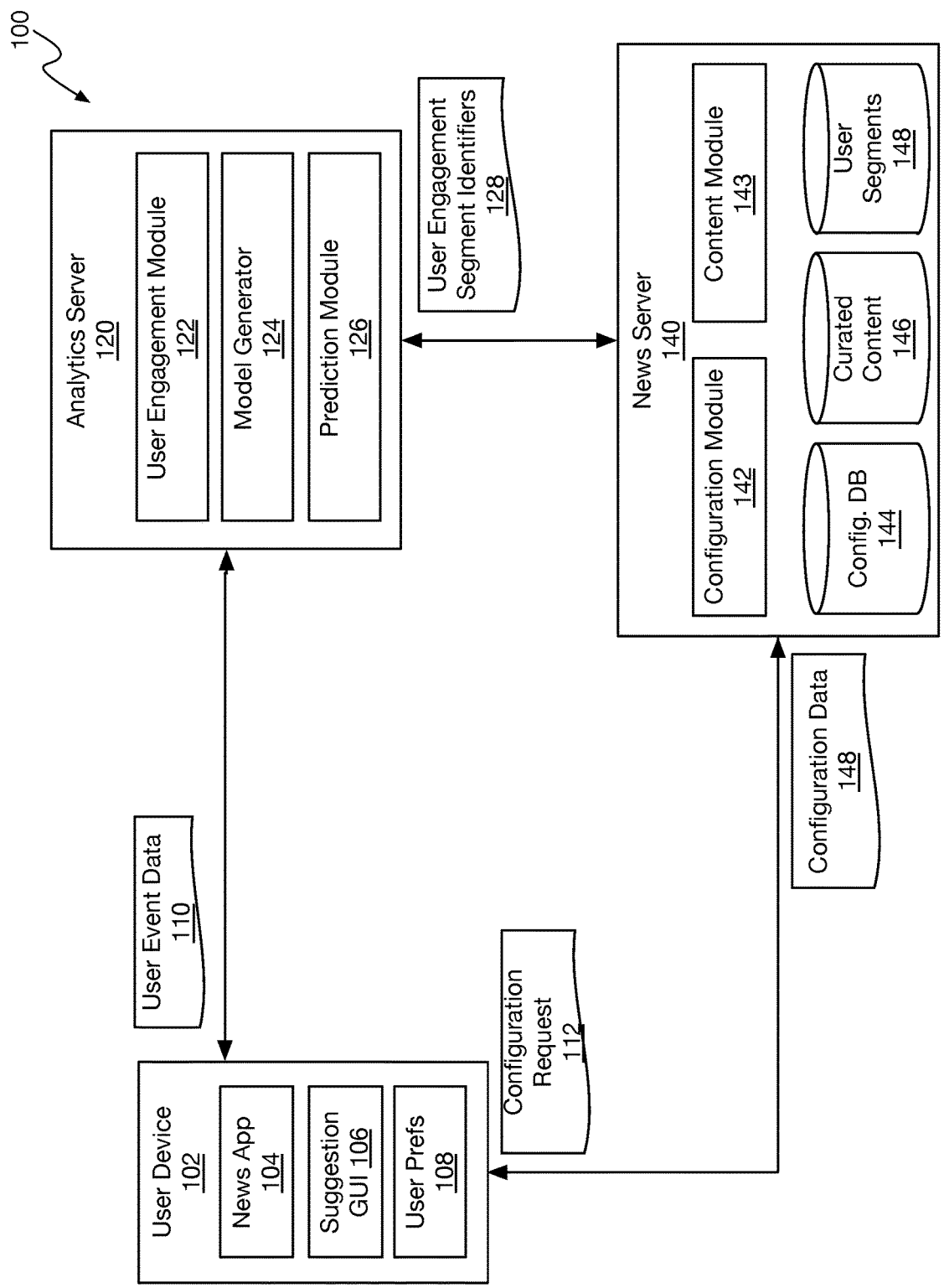
FIG. 1 is a block diagram of an example system for segmenting users based on user engagement with an application on a user device.

FIG. 1 is a block diagram of an example system 100 for segmenting users based on user engagement with an application on a user device. For example, system 100 can analyze user event data to determine user engagement segments to which the user should be associated. A user engagement segment can correspond to a group of users that are grouped together based on behavioral activities and/or behavioral predictions with respect to an application (e.g., a news application) on a user device and/or content presented by the application. In other words, the user engagement segments for a user can be determine based on the user's historical engagement and/or predicted engagement with the application and/or content presented by the application.

In some implementations, system 100 can include user device 102. For example, user device 102 can be a computing device, such as a laptop computer, tablet computer, smartphone, wearable device (e.g., smart watch, smart glasses, etc.), and/or other types of computing devices.

In some implementations, user device 102 can include news application 104. For example, news application 104 can be a software application installed on user device 102. News application 104 can be part of the operating system of user device 102. News application 104 can be a standalone application installed on user device 102. News application 104 can be a first party application created by the developer who manufactured user device 102 and/or the operating system thereon. News application 104 can be a third-party application created by a developer unrelated to the developer who manufactured user device 102 and/or the operating system thereon. User device 102 can be a single user device configured for use by a single user. User device 102 can be a multiuser device configured for use by multiple users. The use of the term "user" herein refers to either the single user of the single user device or one of the users of the multiuser device.

In some implementations, news application 104 can present content items for the user's consumption from various sources. For example, news application 104 can obtain content items (e.g., news articles, opinion pieces, short stories, image galleries, video content, etc.) from various content publishers (e.g., newspaper publishers, online magazines, websites, bloggers, etc.) and present the content items on a display of the user device. News application 104 can present content item suggestions (e.g., headlines, links, etc.) so that the user can quickly find other content items of interest to consume (e.g., read, view, watch, listen to, etc.). News application 104 can obtain and present the content items and/or content item suggestions based on, among other things, user preferences 108 and/or application configuration for news application 104. For example, user preferences 108 can include preference data that describes content topics, content publisher, and/or other preferences for content that may be presented by news application 104.

In some implementations, user device 102 can include suggestion graphical user interface 106. For example, suggestion graphical user interface (GUI) 106 can be a function and/or feature of the operating system of user device 102. Suggestion GUI 106 can present content item suggestions (e.g., news headlines, content item titles, links to content items, content item metadata, etc.) for content items that the user may enjoy based on user preferences 108 and/or application configuration data for news application 104. Suggestion GUI 106 can be associated with news application 104 in that content item suggestions presented on suggestion GUI 106 are determined based on user preferences 108 and news application configuration data. However, suggestion GUI 106 can be presented separately from news application 104 by the operating system of user device 102. When a user selects a content item suggestion presented by suggestion GUI 106, suggestion GUI 106 can launch news application 104 to present the selected content item to the user within news application 104. Thus, suggestion GUI 106 can refer users to news application 104 when a user selects a suggestion content item presented by GUI 106.

Figure 2:
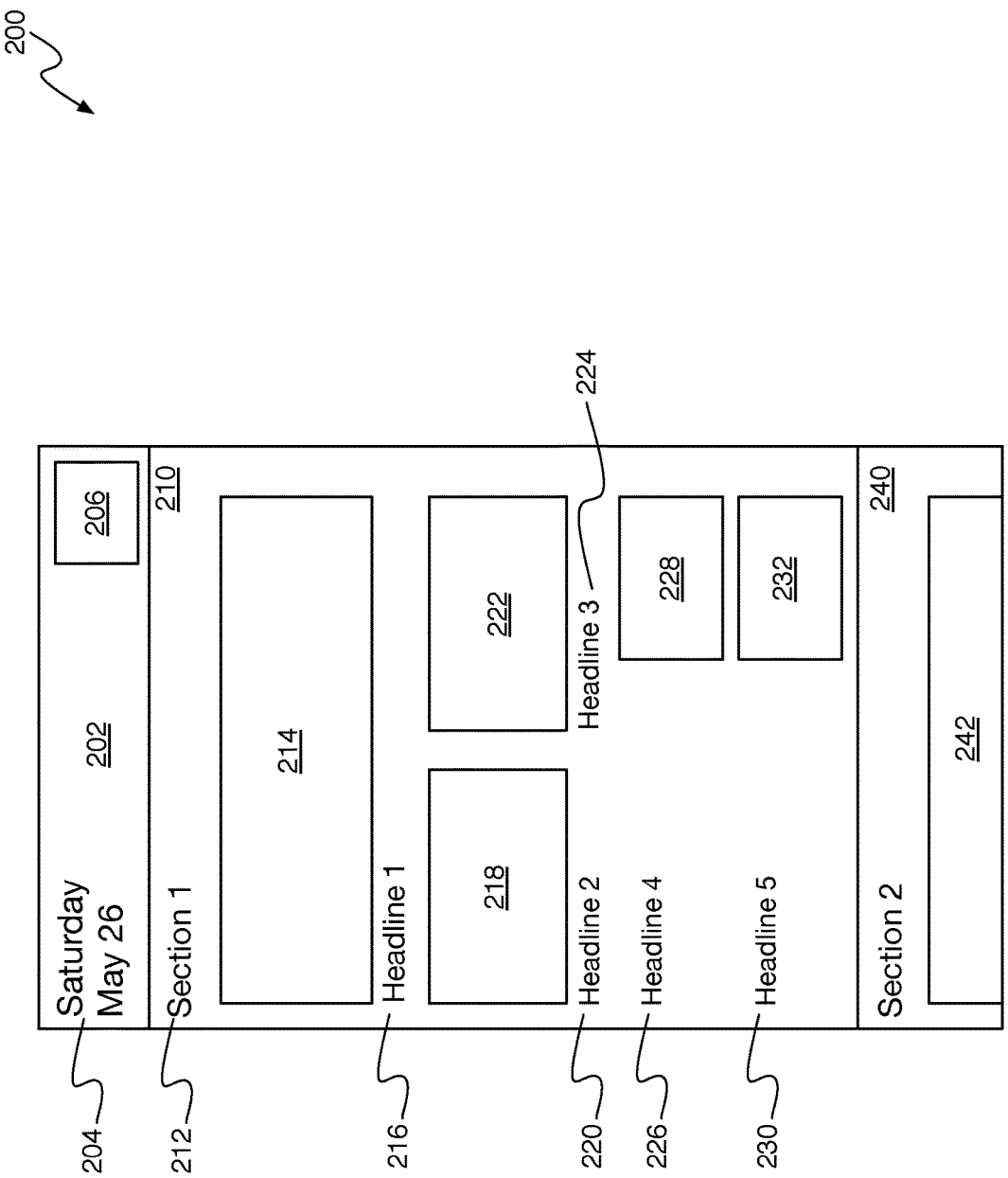
FIG. 2 illustrates an example graphical user interface for presenting content item suggestions on a display of a user device.

FIG. 2 illustrates an example graphical user interface 200 for presenting content item suggestions on a display of user device 102. For example, GUI 200 can be presented by news application 104 and/or suggestion GUI 106 when invoked by a user of user device 102. GUI 200 can include header section 202, including the current date 204 and an image 206 representing news application 104.

GUI 200 can include suggested content section 210. For example, suggested content section 210 can present suggested content items determine or generated based on application configuration data and/or user preferences for news application 104. Section 210 can be a curated content section (e.g., generated based on content selected by human curators). For example, section 210 can include top stories, trending stories, and/or other content selected by curators and with minimal regard for the user's personal preferences.

Alternatively, section 210 can be a personalized content section generated based on user selected preferences, implied preferences, demographics, and/or other data specific to the user. For example, user selected preferences can include topics and/or content providers that the user has explicitly liked or followed. Implied preferences can include topics and/or content providers that news application 104 has determined that the user has an affinity for based on historical viewing/reading patterns. User preferences 108 can include user selected user preferences and/or implied preferences. For example, section 210 can be a "For You" section generated specifically for the user based on user preferences 108.

In some implementations, section 210 can include a section title 212 and metadata describing or identifying selected content items selected by news application 104. For example, the metadata can include a title or headline (e.g., 216, 220, 224, 226, 230, etc.) for the selected content items and/or an image (e.g., 214, 218, 222, 228, 232, etc.) representing the selected content items.

Section 210 can be organized based on the application configuration data for news application 104. For example, the application configuration data can specify the number of content items to include in a section, content item sources for the content items, rules for selecting the content items, and/or layout of the content items within the section.

In some implementations, GUI 200 can include multiple sections. For example, GUI 200 can include section 210, section 240, and/or other sections (not shown). Each section 210 and/or 240 can be configured differently. For example, section 210 can include "Top Stories" while section 240 can include "For You" content items. The types, number, and/or order of sections presented in GUI 200 can be configured in the configuration data for news application 104.

Figure 3:
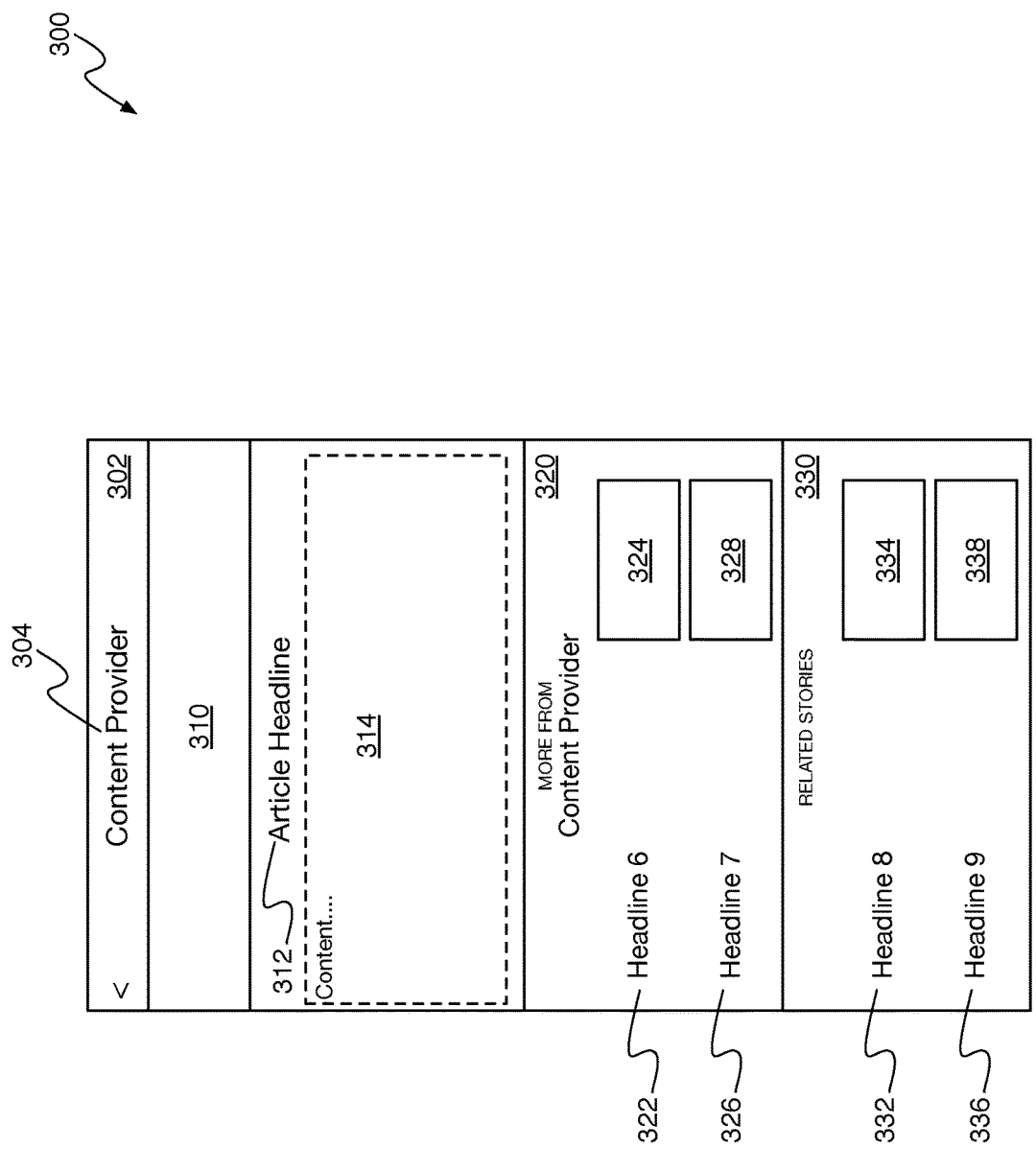
FIG. 3 illustrates an example graphical user interface for presenting a selected content item.

When the user selects a content item represented on GUI 200, news application 104 can request the content item from a content item source (e.g., a server device, news feed, content server, etc.) and present the contents of the content item, as illustrated by GUI 300 of FIG. 3.

FIG. 3 illustrates an example graphical user interface 300 for presenting a selected content item. For example, GUI 300 can be presented by news application 104 in response to the user selecting a content item represented on GUI 200 of news application 104 or suggestion GUI 106.

In some implementations, GUI 300 can include header 302 that includes a graphical element 304 that identifies the content provider of the selected content item. GUI 300 can include an image 310 representing or associated with the selected content item. GUI 300 can include the content of the content item, including headline 312 and content 314 (e.g., text, video, additional images, audio, etc.). In the example of FIG. 3, content 314 can be textual content (e.g., a news article, opinion piece, short story, etc.).

In some implementations, GUI 300 can include suggested content item sections 320 and/or 330. For example, the suggested content item sections 320 and/or 330 can be presented at the end of the content of the selected content item to give the user an opportunity to find and/or select additional content items to consume (e.g., read, view, watch, listen to, etc.).

In some implementations, suggested content item section 320 can include content item suggestions from the same content provider (e.g., publisher, news feed, etc.) who generated content 314. For example, this "More From" section 320 can present metadata (e.g., headlines, titles, images, summaries, etc.) for a configurable number of suggested content items. For example, the configuration for section 320 can be provided in the application configuration data for news application 104. The content items can be selected based on rules specified in the application configuration data.

In some implementations, suggested content item section 330 can include content item suggestions that are related to the content 314 presented in GUI 300. For example, this "Related Stories" section 330 can present metadata (e.g., headlines, titles, images, summaries, etc.) for a configurable number of suggested content items that are related by topic (e.g., across various content providers) to content 314. For example, the configuration for section 330 can be provided in the application configuration data for news application 104. The content items can be selected based on rules specified in the application configuration data.

Referring back to FIG. 1, as a user interacts with GUI 200 and/or GUI 300, described above, news application 104 can generate event data describing the user's interactions and/or behaviors (e.g., "user event data" collectively) with respect to news application 104 and/or the content items and/or content item suggestions presented by news application 104 and/or suggestions GUI 108. Some examples of the user event data collected by news application 104 can include launching news application 104, where news application 104 is launched from (e.g., engagement source), suggested content items presented to or seen by the user, content items consumed by the user, the number of content items consumed by the user, the amount of time a user spends using news application 104 or consuming a content item, the number of unique content topics viewed or consumed by the user, etc. Additional types of user event data may be described below.

After generating user event data, news application 104 can send the user event data (e.g., user event data 110) to analytics server 120. For example, news application 104 can send user event data 110 on a periodic basis (e.g., every day, every 4 hours, every other day, etc.). News application 104 can send user event data 110 in response to detecting various events, such as news application 104 becoming a background process on user device 102, the user closing news application 104, news application 104 becoming idle for a period of time, etc.

User event data 110 can include an anonymous user identifier for associating the user event data in user event data 110. For example, the user of user device 102 can be assigned an anonymous user identifier by news application 104. The anonymous user identifier can be used for grouping the user event data collected or generated by news application 104 and reporting the user event data to analytics server 120 to track user behavior over time. The anonymous user identifier can be used to associated user event data across multiple user devices. For example, when the user uses news application 104 on multiple different user devices 102, each user device 102 or news application 104 can be configured with the same anonymous user identifier so that the user event data 110 for the user can be associated, grouped together, or analyzed together by analytics server 120. The user of user device 102 can reset (e.g., generate a new identifier) the anonymous user identifier at any time if the user wishes to prevent long term tracking of user event data by analytics server 120. The user can opt out of user event data generation and reporting, if desired by the user. However, the anonymous user identifier is created in such a way as to prevent devices (e.g., analytics server 120, news server 140, etc.) other than user device 102 from being able to specifically identify the user and/or user device 102 based on the anonymous user identifier. Thus, in some implementations, the anonymous user identifier is just a mechanism by which activities associated with a specific user can be grouped together without actually identifying the user or user device.

In the descriptions herein, the terms "anonymous user identifier" and "user identifier" both refer to the anonymous user identifier unless otherwise defined. Moreover, the terms "user" and "user identifier" may be used interchangeably. For example, the computing devices of system 100, other than user device 102, may analyze and/or generate data for a user but do so with reference to the anonymous user identifier as described above. Thus, for example, when describing determining a user engagement segment for a user, the user engagement segment is actually done with reference to the anonymous user identifier and the user event data associated therewith. User device 102 is the only computing device that can translate the anonymous user identifier to an actual identifier that can be used to identify the user of user device 102.

While FIG. 1 shows a single user device 102 for simplicity and ease of understanding, system 100 can include multiple (e.g., thousands, millions, etc.) of user devices 102 that report user event data 110 to analytics server 120. Analytics server 120 can then analyze the user even data 110 for the user devices 102 to generate user engagement segments and segment models, as described further below.

In some implementations, system 100 can include analytics server 120. For example, analytics server 120 can be a computing device accessible to user device 102 through a network (e.g., local area network, wide area network, the Internet, etc.). Analytics server 120 can be configured or programmed to analyze user event data 110 received from multiple user devices 102 to generate user engagement segments and/or predictive models (e.g., machine learning models) for particular user engagement segments, as described further below. In some implementations, analytics server 120 can analyze user event data 110 corresponding to a particular user (e.g., user identifier) to determine to which user engagement segments the particular user should be associated, as described further below.

In some implementations, analytics server 120 can include user lifecycle module 122. For example, user lifecycle module can analyze user event data 110 to determine various user engagement segments related to the user engagement lifecycle and user engagement sources, as described further below.

In some implementations, analytics server 120 can include model generator 124. For example, model generator 124 can generate predictive machine learning models (e.g., random forest models) for each user engagement segment based on user event data received from (e.g., thousands of, millions of, etc.) user devices 102. For example, the predictive models can be configured to predict whether a user will adopt (e.g., regularly or consistently use) news application 104 as a source of content, churn (e.g., stop using news application 104), migrate up (e.g., the user will increase their engagement with news application 104), or migrate down (e.g., the user will decrease their engagement with news application 104).

In some implementations, analytics server 120 can include prediction module 126. For example, prediction module 126 can predict, for a particular user, future engagement behaviors (e.g., adopt, churn, migrate up, migrate down, etc.) of the user based on the user engagement segments determined for the particular user, the predictive models for the determined user engagement segments, and the user event data associated with the particular user.

User Engagement Segments

Figure 4:
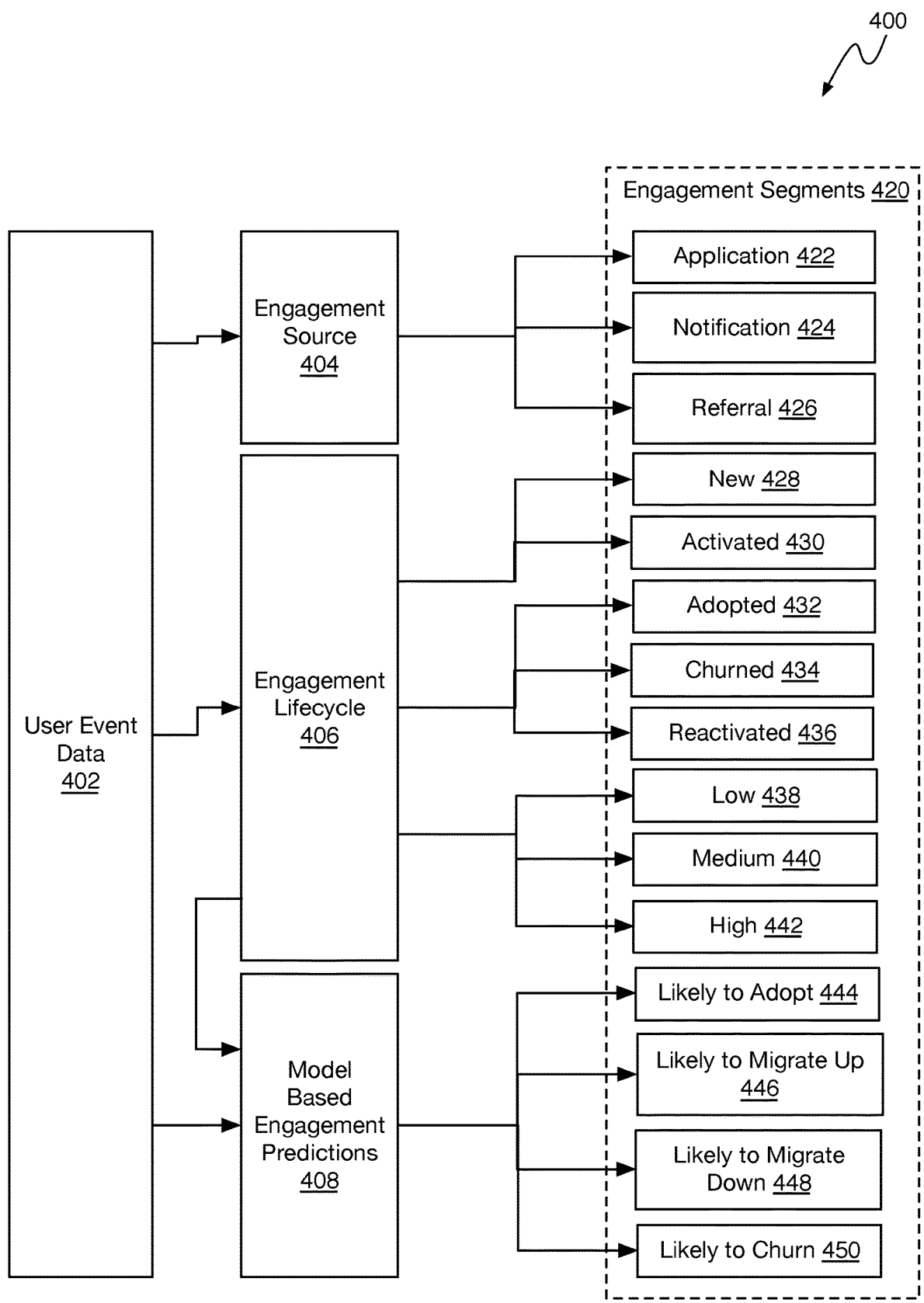
FIG. 4 is an example data flow illustrating how user engagement segments are determined.

FIG. 4 is an example data flow 400 illustrating how user engagement segments are determined. For example, analytics server 120 can analyze user event data 402 to determine to which user engagement segments 420 the user identified in the user event data 402 should be associated. User event data 402 can correspond to user event data 110, for example. After determining the user engagement segments 420 associated with the user, analytics server 120 can store the user engagement segments for the particular user in association with the user identifier for the user in user segments database 148.

In some implementations, user engagement module 122 can analyze user event data 402 to determine user engagement segments 420 related to user engagement source 404. For example, module 122 can analyze user event data 104 to determine whether the user initiated their engagement with news application 104 by invoking news application 104 directly (e.g., by selecting an icon or graphic representing news application 104). When the user has invoked news application directly, module 122 can associate the user with application source engagement segment 422 (e.g., application segment 422).

Module 122 can analyze user event data 104 to determine whether the user initiated their engagement with news application 104 by selecting a notification presented on a display of user device 102. For example, user device 102 and/or news application 104 can present notifications on the display of user device 102 to notify the user of user device 102 of content items that the user may be interested in. The user may select the notification to launch news application 104 and consume the content item identified in the notification. When the user has invoked news application from a notification, module 122 can associate the user with notification source engagement segment 424 (e.g., notification segment 424).

Module 122 can analyze user event data 104 to determine whether the user initiated their engagement with news application 104 by selecting a content item represented by suggestion GUI 106. When the user has been referred to news application from suggestion GUI 106 in response to the user selecting a content item represented on suggestion GUI 106, module 122 can associate the user with referral source engagement segment 424 (e.g., referral segment 424).

In some implementations, the user may be associated with multiple engagement source segments. For example, the user may invoke news application 104 from multiple sources and user event data 402 may include event data identifying these multiple sources. Thus, a user may be associated with application source 422, notification source 424, referral source 426, or a combination thereof.

In some implementations, user engagement module 122 can analyze user event data 402 to determine user engagement segments 420 related to various stages of user engagement lifecycle 406. For example, the engagement lifecycle segments can include new user segment 428, activated user segment 430, adopted user segment 432, churned user segment 434, and/or reactivated user segment 436, low engaged user segment 438, medium engaged user segment 440, and highly engaged user segment 442. These user engagement lifecycle-based user engagement segments 420 (e.g., lifecycle stages) are defined further below with reference to FIG. 5.

In some implementations, user engagement segments can correspond to model-based user engagement predictions 408. For example, analytics server 120 can include model generator 124 that can generate predictive models for predicting whether a user is likely to adopt news application 104 as a source of content, likely to migrate up to a higher engagement level (e.g., low engagement level to medium engagement level, medium engagement level to high engagement level), likely to migrate down to a lower engagement level (e.g., high engagement level to medium engagement level, medium engagement level to low engagement level), or likely to stop using news application 104 (e.g., churn). The engagement models can be generated (e.g., trained) based on user event data received from many different user devices. Different engagement models can be generated for each user lifecycle-based user engagement segment. The future behavior (e.g., adoption, migrate up, migrate down, churn, etc.) of a particular user can be predicted by prediction module 126 of analytics server 120 using the prediction models, based on the current lifecycle stage of the particular user and the user event data received for the particular user, as described further below. The predicted behavior can then be used to determine with which prediction-based engagement segments (e.g., likely to adopt 444, likely to migrate up 446, likely to migrate down 448, likely to churn 450) the user is associated. Model generation and model-based predictions are described in greater detail below.

User Engagement Lifecycle

Figure 5:
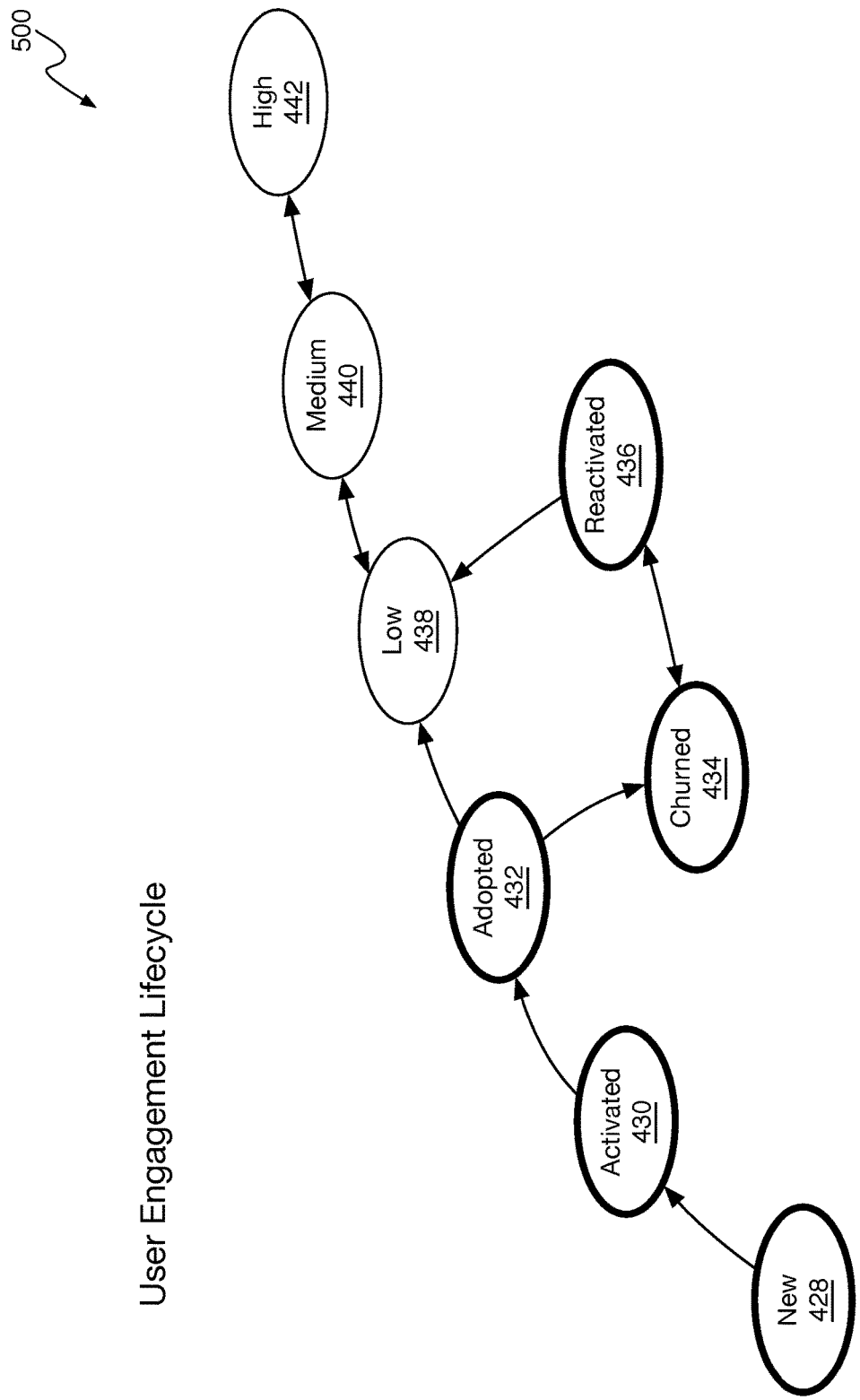
FIG. 5 is a state diagram illustrating an example user engagement lifecycle.

FIG. 5 is a state diagram illustrating an example user engagement lifecycle 500. For example, user engagement lifecycle 500 can correspond to user engagement lifecycle 406, described above. Each stage in user engagement lifecycle 500 can have corresponding rules for determining when a user transitions from one stage to another stage. User engagement module 122 can analyze user event data 402 with respect to the rules to determine with which engagement lifecycle stage the user is should be associated. Since the user's behavior with respect to news application 104 may change over time (as indicated by user event data 402), the engagement lifecycle stage associated with the user may change over time as well. The user engagement lifecycle stages are associated with a single user identifier (e.g., anonymous user identifier). Thus, if the user resets or changes the user identifier, the lifecycle stage analysis will restart from new user stage 428.

In some implementations, user engagement lifecycle 500 can include new user stage 428. For example, when user event data 402 indicates that the user has invoked news application 104 (e.g., through direct invocation, notification, referral, etc.) for the first time, user engagement module 122 can determine that the user is in the new user stage 428. The user will stay in new user stage 428 until the user selects the first content item to view in news application 104.

In some implementations, user engagement lifecycle 500 can include activated user stage 430. For example, when user event data 402 indicates that a new user (e.g., a user associated with new user stage 428) has viewed their first content item or selected their first content item for viewing, user engagement module 122 can determine that the user has transitioned to the activated user stage 430. The user will stay in activated user stage 430 until the user transitions to the adopted user stage 432.

In some implementations, user engagement lifecycle 500 can include adopted user stage 432. For example, when user event data 402 indicates that an activated user (e.g., a user at activated user stage 430) has viewed a number (e.g., 3, 4, 5, etc.) additional content items in a period of time (e.g., within 14 days of activation), user engagement module 122 can determine that the user has transitioned to the adopted user stage 432. The user will stay in adopted user stage 432 until the user transitions to the churned user stage 434.

In some implementations, user engagement lifecycle 500 can include churned user stage 434. For example, when user event data 402 indicates that an adopted user (e.g., a user at adopted user stage 432) has stopped user news application 104 and/or has not viewed a content item through news application 104 for a period of time (e.g., 4 weeks, 1 month, etc.), user engagement module 122 can determine that the user has transitioned to the churned user stage 434. The user will stay in churned user stage 434 until the user transitions to the reactivated user stage 436.

In some implementations, user engagement lifecycle 500 can include reactivated user stage 436. For example, when user event data 402 indicates that a churned user (e.g., a user at churned user stage 434) has started using news application 104 and/or has not viewed a content item through news application 104 again, user engagement module 122 can determine that the user has transitioned to the reactivated user stage 436. The user will stay in reactivated user stage 436 until the user transitions to the churned user stage 434. For example, over time, the user may oscillate between churned stage 434 and reactivated stage 436 depending on the analysis of user event data 402, as described above.

In some implementations, user engagement lifecycle 500 can include low engagement stage 438. For example, user event data 402 can be analyzed by user engagement module 122 to determine the level of engagement of the user, as described below. When the evaluation of user event data 402 indicates that the user has a low level of engagement with news application 104, user engagement module 122 can determine that the user has transitioned to the low engagement stage 438. The user will stay in low engagement stage 438 until the user transitions to medium engagement stage 440, high engagement stage 442, or churned user stage 434.

In some implementations, user engagement lifecycle 500 can include medium engagement stage 440. For example, user event data 402 can be analyzed by user engagement module 122 to determine the level of engagement of the user, as described below. When the evaluation of user event data 402 indicates that the user has a medium level of engagement with news application 104, user engagement module 122 can determine that the user has transitioned to the medium engagement stage 440. The user will stay in medium engagement stage 440 until the user transitions to low engagement stage 438, high engagement stage 442, or churned user stage 434.

In some implementations, user engagement lifecycle 500 can include high engagement stage 442. For example, user event data 402 can be analyzed by user engagement module 122 to determine the level of engagement of the user, as described below. When the evaluation of user event data 402 indicates that the user has a high level of engagement with news application 104, user engagement module 122 can determine that the user has transitioned to high engagement stage 442. The user will stay in high engagement stage 442 until the user transitions to low engagement stage 438, medium engagement stage 440, or churned user stage 434.

In some implementations, a user can be associated with more than one user engagement lifecycle stage at a given time. For example, an adopted user (e.g., associated with adopted stage 432) will remain an adopted user while the user also transitions between low, medium, and high engagement levels within the user engagement lifecycle. Similarly, a reactivated user (e.g., associated with reactivated stage 442) will remain a reactivated user while the user also transitions between low, medium, and high engagement levels within the user engagement lifecycle. However, new, activated, adopted, churn, and reactivated stages (stages having bold outlines in FIG. 5) can be mutually exclusive; the user may be associated with only one of these user engagement lifecycle stages at a time.

User Engagement Levels

In some implementations, user engagement module 122 can determine the level of engagement a user has with respect to news application 104 based on various engagement categories. For example, a score can be determined for each engagement category. The scores determined for each category can be combined (e.g., summed) to generate an engagement level score. The engagement level score can be compared to threshold values for each engagement level (e.g., high, medium, low, etc.) to determine with which engagement level the user should be associated.

In some implementations, user engagement module 122 can determine the level of engagement a user has with respect to news application 104 based on a recency engagement category. For example, a score generated or determined for the recency engagement category can correspond to a number of days since the user last viewed a content item, as determined by user engagement module 122 based on user event data 402. For example, if the recency category is scored 1-5, then a score of 5 can correspond to 1 day since the user last viewed a content item. A score of 4 can correspond to 2 days since the user last viewed a content item. A score of 3 can correspond to 3-6 days since the user last viewed a content item. A score of 2 can correspond to 7-12 days since the user last viewed a content item. A score of 1 can correspond to greater than 12 days since the user last viewed a content item. These scores are merely one example of how scores can be generated for the recency engagement category; other scoring schemes can be used and/or implemented.

In some implementations, user engagement module 122 can determine the level of engagement a user has with respect to news application 104 based on a frequency engagement category. For example, a score generated or determined for the frequency engagement category can correspond to a number of article views in a previous period of time (e.g., the previous 30 days), as determined by user engagement module 122 based on user event data 402. For example, if the frequency category is scored 1-5, then a score of 5 can correspond to greater than or equal to 30 views. A score of 4 can correspond to 14-29 views. A score of 3 can correspond to 4-13 views. A score of 2 can correspond to 2-3 views. A score of 1 can correspond to 1 view. These scores are merely one example of how scores can be generated for the frequency engagement category; other scoring schemes can be used and/or implemented.

In some implementations, user engagement module 122 can determine the level of engagement a user has with respect to news application 104 based on a duration engagement category. For example, a score generated or determined for the duration engagement category can correspond to an amount of time the user has spent viewing content items in a previous period of time (e.g., the previous 30 days), as determined by user engagement module 122 based on user event data 402. For example, if the duration category is scored 1-5, then a score of 5 can correspond to greater than or equal to 70 minutes. A score of 4 can correspond to 20-69 minutes. A score of 3 can correspond to 5-19 minutes. A score of 2 can correspond to 1-4 minutes. A score of 1 can correspond to less than 1 minute. These scores are merely one example of how scores can be generated for the frequency engagement category; other scoring schemes can be used and/or implemented.

In some implementations, user engagement module 122 can determine the level of engagement a user has with respect to news application 104 based on a duration engagement category. For example, a score generated or determined for the duration engagement category can correspond to an amount of time the user has spent viewing content items in a previous period of time (e.g., the previous 30 days), as determined by user engagement module 122 based on user event data 402. For example, if the duration category is scored 1-5, then a score of 5 can correspond to greater than or equal to 70 minutes. A score of 4 can correspond to 20-69 minutes. A score of 3 can correspond to 5-19 minutes. A score of 2 can correspond to 1-4 minutes. A score of 1 can correspond to less than 1 minute. These scores are merely one example of how scores can be generated for the duration engagement category; other scoring schemes can be used and/or implemented.

In some implementations, user engagement module 122 can determine the level of engagement a user has with respect to news application 104 based on a breadth engagement category. For example, a score generated or determined for the breadth engagement category can correspond to the number of unique content item topics viewed by the user in a previous period of time (e.g., the previous 30 days), as determined by user engagement module 122 based on user event data 402. For example, if the breadth category is scored 1-5, then a score of 5 can correspond to greater than or equal to 40 unique topics viewed. A score of 4 can correspond to 20-39 unique topics viewed. A score of 3 can correspond to 10-19 unique topics viewed. A score of 2 can correspond to 6-9 unique topics viewed. A score of 1 can correspond to less than 6 unique topics viewed. These scores are merely one example of how scores can be generated for the breadth engagement category; other scoring schemes can be used and/or implemented.

In some implementations, user engagement module 122 can determine the level of engagement a user has with respect to news application 104 based on a consistency engagement category. For example, a score generated or determined for the consistency engagement category can correspond to the number of day parts during which the user has viewed content items in a previous period of time (e.g., the previous 30 days), as determined by user engagement module 122 based on user event data 402. For example, a day can be divided into a number (e.g., 3) of day parts. Thus, if the previous period of time is 30 days and the number of day parts per day is 3, then the total number of day parts over the 30-day period is 90. User engagement module 122 can determine the number of day parts having at least one view over the 30-day period and generate a score based on this number. For example, if the consistency category is scored 1-5, then a score of 5 can correspond to greater than or equal to 70 day parts. A score of 4 can correspond to 21-69 day parts. A score of 3 can correspond to 9-20 day parts. A score of 2 can correspond to 6-9 day parts. A score of 1 can correspond to less than 6 day parts. These scores are merely one example of how scores can be generated for the consistency engagement category; other scoring schemes can be used and/or implemented.

In some implementations, user engagement module 122 can determine an engagement level score based on the engagement category scores described above. For example, user engagement module 122 can combine the scores (e.g., calculate the sum, average, weighted average, etc.) determined for the recency category, frequency category, duration category, breadth category, and consistency categories described above. Based on the combination, user engagement module 122 can determine the engagement level score. For example, if the engagement categories are scored 1-5, when the sum of the engagement category scores is 22-25, user engagement module 122 can determine that the user engaged with news application 104 at a high level (e.g., corresponding to high user engagement lifecycle stage/segment 442). When the sum of the engagement category scores is 14-21, user engagement module 122 can determine that the user engaged with news application 104 at a medium level (e.g., corresponding to medium user engagement lifecycle stage/segment 440). When the sum of the engagement category scores is 5-13, user engagement module 122 can determine that the user engaged with news application 104 at a low level (e.g., corresponding to low user engagement lifecycle stage/segment 438).

Generating Prediction Models

Referring back to FIG. 1, in some implementations, analytics server 120 can include segmentation module 122 and model generator 124. For example, model generator 124 can be a software module that generates prediction models based on user event data associated with many different users, for different engagement segments, for various types of behavior predictions, and/or a combination thereof, as illustrated by FIG. 6.

Figure 6:
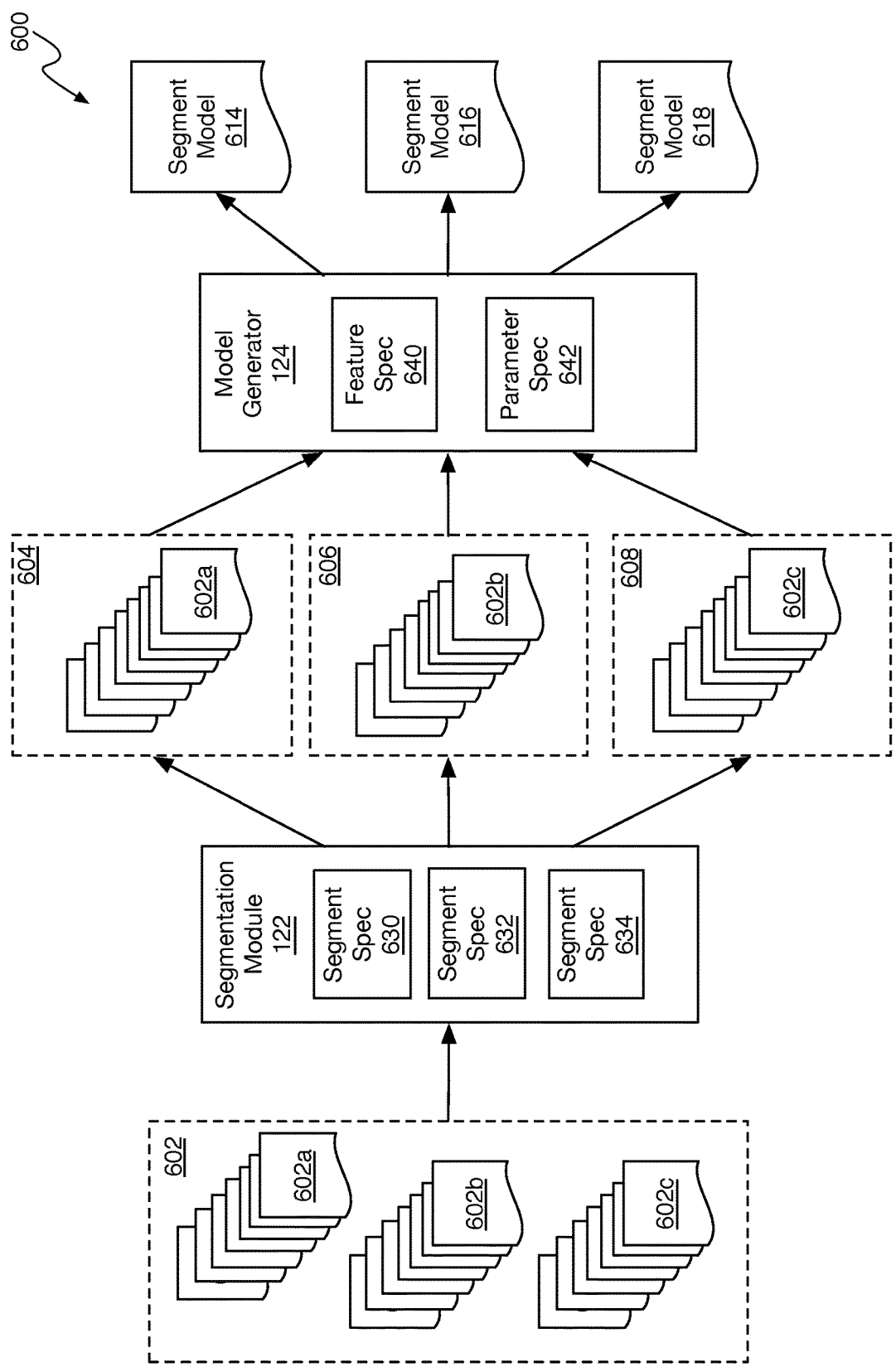
FIG. 6 illustrates an example data flow for generating prediction models for different user segments and user engagement predictions.

FIG. 6 illustrates an example data flow 600 for generating prediction models for different user segments and user engagement predictions. For example, analytics server 120 can receive user event data 602 describing user engagement activities with respect to news application 104 from various user devices 102. User event data 602 can correspond to user event data 110 and/or 402 described above. For example, user event data 602*a* can be received from a first user device associated with a first user identifier. User event data 602*b* can be received from a second user device associated with a second user identifier. User event data 602*c* can be received from a third user device associated with a third user identifier. While the description that follows describes generating prediction models with respect to user event data 602*a*, 602*b*, and 602*c*, user event data 602 can include thousands of instances user event data from thousands of different devices associated with thousands of user identifiers.

In some implementations, segmentation module 122 can be configured with segment specification 630, segment specification 632, and/or segment specification 634. For example, the segment specifications 630, 632, and 634 can specify for which user engagement segments 420 (or combination thereof) and for which outcomes (e.g., adopted, migrate up, migrate down, churn, etc.) a prediction model should be generated. For example, segment specification 630 can specify that a prediction model should be generated based on users who were in the activated segment who transitioned to the adopted segment. Segment specification 632 can specify that a prediction model should be generated based on users who were in the adopted and low engagement segments who migrated up to the medium engagement segment. Segment specification 634 can specify that a prediction model should be generated for users who were in the adopted and medium engagement segments who migrated up to a high engagement segment.

A segment specification (not shown) can specify that a prediction model should be generated based on users who were in the adopted and high engagement segments who migrated down to the medium engagement segment. A segment specification (not shown) can specify that a prediction model should be generated for users who were in the adopted and medium engagement segments who migrated down to a low engagement segment. A segment specification (not shown) can specify that a prediction model should be generated for users who were in the adopted and medium engagement segments who migrated down to a low engagement segment. A segment specification (not shown) can specify that a prediction model should be generated for users who were in the adopted segments who transitioned to the churn segment. Many other variations of segment specifications can be specified.

Segment specifications 630, 632, and/or 634 can be further refined by adding other engagement segments to the segment specifications. For example, a segment specification can specify that a prediction model should be generated for users in the reactivated segment, high engagement segments, and the referral engagement segment. Segment specification 630 can include any combination of user engagement segments 420.

In some implementations, segmentation module 122 can generate user base tables 604, 606, and/or 608 based on segment specifications 630, 632, and 634, respectively. For example, to generate user base table 604, segmentation module 122 can filter user event data 602 based on segment specification 630 so that user base table 604 only includes user event data corresponding to the starting user engagement segment and outcome specified in segment specification 630. Stated differently, the segment specifications can be configured such that the user base tables include user event data associated with users who have made the engagement segment transitions that are to be predicted (e.g., adoption, churn, migration, etc.). Thus, when the predictive models are generated and/or trained using the user base tables, the models are generated and/or trained using user event data associated with users who have made the engagement segment transitions that are to be predicted (e.g., adoption, churn, migration, etc.).

For example, if user event data 602*a* corresponds to segment specification 630 (e.g., user event data 602*a* has user event data that indicates a desired starting user engagement segment and a transition to a desired resulting engagement segment) then user event data 602*a*, and user event data similar to user event data 602*a*, can be stored in user base table 604. Similarly, user base table 606 can be generated based on segment specification 632 and may include user event data 602b and similar user event data. User base table 608 may can be generated based on segment specification 634 and may include user event data 602c and similar user event data.

In some implementations, model generator 124 can generate and/or train predictive segment models 614, 616, and/or 618 based on user base tables 604, 606, and/or 608, respectively. For example, the predictive segment models can be machine learning models (e.g., random forest models). Model generator 124 can be configured with a feature specification for each type of predictive segment model. For example, the type of predictive segment model can be determined based on segment specification 630, 632, and/or 634. For example, the type of segment model can correspond to or be defined by the starting engagement segment and the resulting engagement segment (e.g., outcome) specified by each segment specification 630, 632, and/or 634.

In some implementations, feature specification 640 can define features for the predictive segment models. For example, model generator 124 can have a feature specification 640 that defines features that are predictive of a user transitioning from activated engagement segment 430 to adopted engagement segment 432. These features can be used to generate a user adoption model that can be used to predict whether an activated user will become an adopted user. Categories of features can include news application session related features, content engagement related features, features related to the user's exploration of news application 104, time information, and/or content information. Specific feature examples can include "For You" headline impressions per session within news application 104, headline click-through rate during the first content item viewing session, the number of "more from" and "related stories" seen at the end of the first content item viewing, the amount of time spent in the first content item viewing session, whether the user has on-boarded (e.g., configured user preferences) into news application 104, and/or the number of unique topics in the "For You" section during the first content item viewing session.

Model generator can have multiple feature specifications 640 for generating churn models for various starting engagement segments. For example, a churn model can be a predictive model that is used to predict whether a user will transition from a starting engagement segment (e.g., activated, adopted, high, medium, low, reactivated, etc.) to the churned engagement segment. Thus, different churn models can be generated for each starting segment. Each different churn model can be configured with a different set of features that are predictive of whether a user will churn from the starting engagement segment. An example feature specification 640 for the churn models can include user characteristic features, such as how long the user has been using news application 104, whether the user has enabled notifications, whether the user has a paid subscription through news application 104. An example feature specification 640 for the churn models can include time differential behavior features, such as click through rate and how many days the user is active within a time period (e.g., previous 30 days). An example feature specification 640 for the churn models can include user archetype features, such as whether the user focuses on one content provider or enjoys many different content providers, whether the user focuses on a single topic or enjoys many different topics, and/or whether the user engages in certain high engagement topics, such as politics or sports. An example feature specification 640 for the churn models can include application launch sources, such as whether the user launches news application 104 directly, by referral (e.g., from suggestion GUI 106), or from a notification.

Model generator can have multiple feature specifications 640 for generating migration models for various starting engagement segments. For example, a migration model can be a predictive model that is used to predict whether a user will transition from a starting engagement level segment (e.g., high, medium, low, etc.) up or down to an ending engagement level segment. Thus, different churn models can be generated for each starting segment/ending segment combination. Each different churn model can be configured with a different set of features that are predictive of whether a user will churn from the starting engagement level segment to the ending engagement level segment. An example feature specification 640 for the migration models can include user characteristic features, such as how long the user has been using news application 104, whether the user has enabled notifications, whether the user has a paid subscription through news application 104.

An example feature specification 640 for the migration models can include time differential behavior features, such as click through rate and how many days the user is active within a time period (e.g., previous 30 days). An example feature specification 640 for the migration models can include user archetype features, such as whether the user focuses on one content provider or enjoys many different content providers, whether the user focuses on a single topic or enjoys many different topics, and/or whether the user engages in certain high engagement topics, such as politics or sports. An example feature specification 640 for the migration models can include application launch sources, such as whether the user launches news application 104 directly, by referral (e.g., from suggestion GUI 106), or from a notification.

An example feature specification 640 for a migration model that leads to upward migration can include whether the user has subscribed to notifications, whether the user has viewed a content item from a new topic in a previous period of time (e.g., the previous 7 days), whether the user has viewed a content item associated with a particular content item topic (e.g., politics, news, arts and entertainment, etc.) in a previous period of time (e.g., the previous 7 days), the amount time the user spent using news application 104 in a previous period of time (e.g., the previous 7 days), and/or the number of days the user has used news application 104 in a previous period of time (e.g., the previous 7 days).

In some implementations, model generator 124 can include model parameter specification 642. For example, model parameter specification 642 can include model parameters that can be adjusted to tune the predictive models so that they produce accurate prediction results. For example, there are several parameters that can be tuned in the random forest model, including the number of trees used in the model, the maximum depth of each tree, the sampling rate, and the feature subset strategy. For example, the feature subset strategy can be set to one third, the maximum depth can be 10, and the sampling rate can be set to one.

After the user tables (e.g., 604, 606, and/or 608) are generated, model generator 124 can train segment models 614, 616, and/or 618 using the user event data in user tables 604, 606 and/or 608, respectively, the feature specification 640, and parameter specification 642 for each segment model. For example, by generating predictive models 614, 616, and/or 618 based on user tables that include user event data representative of users who transitioned from a particular first engagement segment to a particular second engagement segment, the resulting segment models 614, 616, and/or 618 can be specifically trained for predicting the engagement behaviors of users in the particular user engagement segment or segments defined by segment specifications 630, 632, and/or 634. Specific examples of predictive segment models 614, 616, and/or 618 are described further with reference to FIG. 7 below. In some implementations, the predictive segment models can be regenerated and/or trained periodically (e.g., daily, monthly, etc.) so that the models evolve with the engagement behaviors of the users of news application 104.

Figure 7:
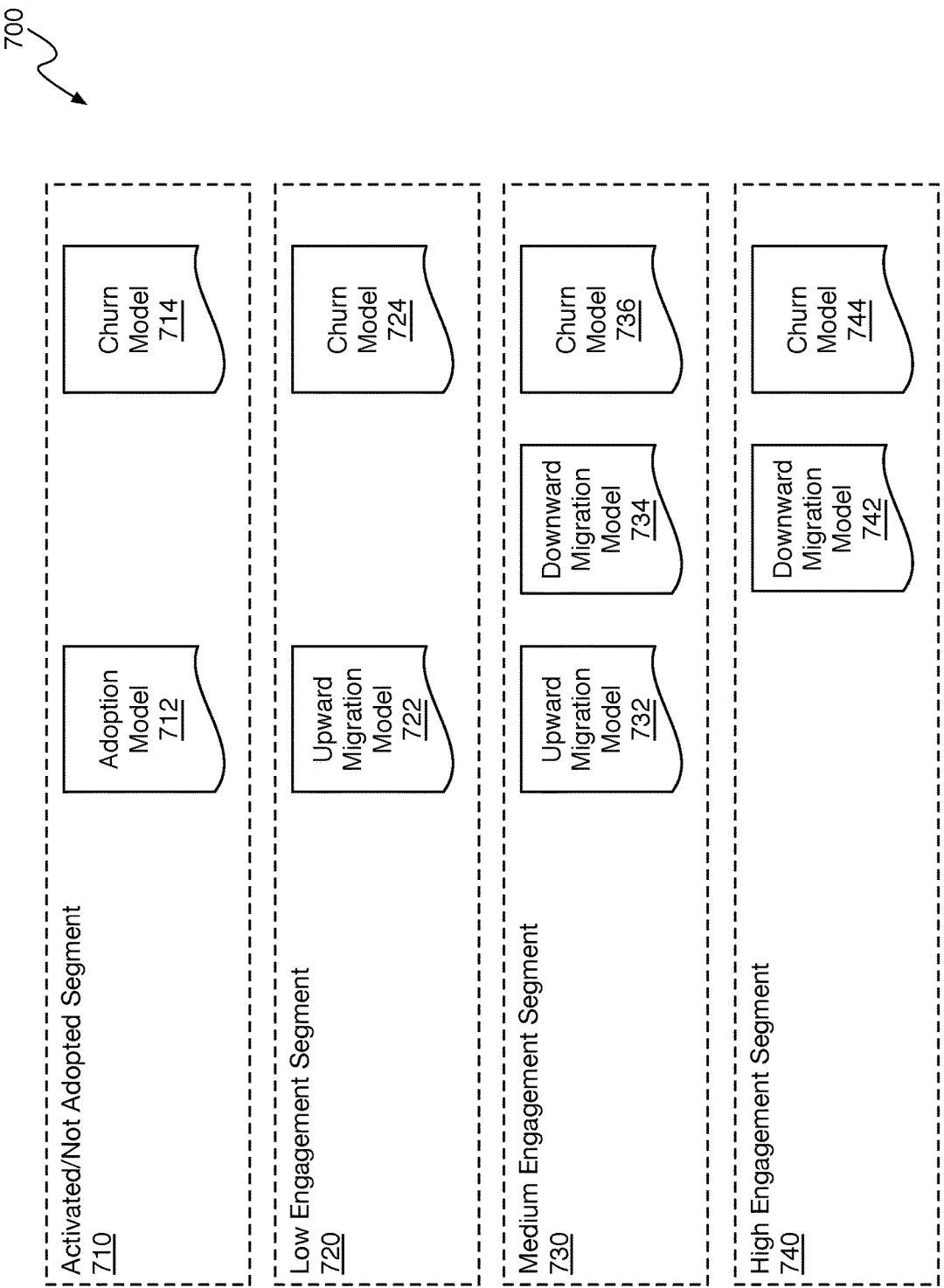
FIG. 7 illustrates examples of predictive segment models generated by system 100.

FIG. 7 illustrates examples of predictive segment models 700 generated by system 100. For example, model generator 124 can generate multiple predictive segment models for each of multiple different user engagement segments. For example, a segment specification (e.g., segment specification 630, 632, 634) can specify a starting user engagement segment 710. The segment specification can further specify an ending user engagement segment so that a predictive model generated using the segment specification can be trained to predict a transition from the starting user engagement segment to the ending user engagement segment.

In some implementations, a segment specification can specify a starting user engagement segment 710 corresponding to the activated (e.g., not adopted) user engagement segment 430 and an ending user engagement segment corresponding to adopted segment 432. Model generator 124 can generate or train, based on the user event data (e.g., the user base table) corresponding to the segment specification, adoption model 712 for the activated (e.g., not adopted) user engagement segment 430 to predict a transition from the activated user engagement segment 430 to the adopted user engagement segment 432.

In some implementations, a segment specification can specify a starting user engagement segment 710 corresponding to the activated (e.g., not adopted) user engagement segment 430 and an ending user engagement segment corresponding to churned segment 434. Model generator 124 can generate or train, based on the user event data (e.g., the user base table) corresponding to the segment specification, churn model 714 for the activated (e.g., not adopted) user engagement segment 430 to predict a transition from the activated user engagement segment 430 to the churned user engagement segment 434.

In some implementations, a segment specification can specify a starting user engagement segment 720 corresponding to the low (e.g., and adopted) user engagement segment 438 and an ending user engagement segment corresponding to medium engagement segment 440. Model generator 124 can generate and/or train, based on the user event data (e.g., the user base table) corresponding to the segment specification, upward migration model 722 for the low user engagement segment 720 to predict a transition from the low user engagement segment 438 to the medium user engagement segment 434.

In some implementations, a segment specification can specify a starting user engagement segment 720 corresponding to the low (e.g., and adopted) user engagement segment 438 and an ending user engagement segment corresponding to churned segment 434. Model generator 124 can generate or train, based on the user event data (e.g., the user base table) corresponding to the segment specification, churn model 724 for the low user engagement segment 720 to predict a transition from the activated user engagement segment 430 to the churned user engagement segment 434.

In some implementations, a segment specification can specify a starting user engagement segment 730 corresponding to the medium (e.g., and adopted) user engagement segment 440 and an ending user engagement segment corresponding to high engagement segment 442. Model generator 124 can generate or train, based on the user event data (e.g., the user base table) corresponding to the segment specification, upward migration model 732 for the medium user engagement segment 730 to predict a transition from the medium user engagement segment 440 to the high user engagement segment 442.

In some implementations, a segment specification can specify a starting user engagement segment 730 corresponding to the medium (e.g., and adopted) user engagement segment 440 and an ending user engagement segment corresponding to low engagement segment 438. Model generator 124 can generate or train, based on the user event data (e.g., the user base table) corresponding to the segment specification, downward migration model 734 for the medium user engagement segment 730 to predict a transition from the medium user engagement segment 440 to the low user engagement segment 438.

In some implementations, a segment specification can specify a starting user engagement segment 730 corresponding to the medium (e.g., and adopted) user engagement segment 440 and an ending user engagement segment corresponding to churned engagement segment 434. Model generator 124 can generate or train, based on the user event data (e.g., the user base table) corresponding to the segment specification, churn migration model 736 for the medium user engagement segment 730 to predict a transition from the medium user engagement segment 440 to the churned user engagement segment 434.

In some implementations, a segment specification can specify a starting user engagement segment 740 corresponding to the high (e.g., and adopted) user engagement segment 442 and an ending user engagement segment corresponding to medium engagement segment 440. Model generator 124 can generate or train, based on the user event data (e.g., the user base table) corresponding to the segment specification, downward migration model 742 for the high user engagement segment 740 to predict a transition from the high user engagement segment 442 to the medium user engagement segment 440.

In some implementations, a segment specification can specify a starting user engagement segment 740 corresponding to the high (e.g., and adopted) user engagement segment 442 and an ending user engagement segment corresponding to churned engagement segment 434. Model generator 124 can generate or train, based on the user event data (e.g., the user base table) corresponding to the segment specification, churn migration model 744 for the high user engagement segment 740 to predict a transition from the high user engagement segment 442 to the churned user engagement segment 434.

The predictive user engagement models described above are merely examples of some models that may be generated by system 100 based on different combinations of starting user engagement segments and/or ending user engagement segments. Other predictive models can be generated and/or trained by model generator 124. For example, models can be generated to predict transitions from churned engagement segment 434 to reactivated engagement segment 436, from activated segment 430 to churned segment 434, or any other combinations of user engagement segments and/or transitions.

Predicting User Behavior

Figure 8:
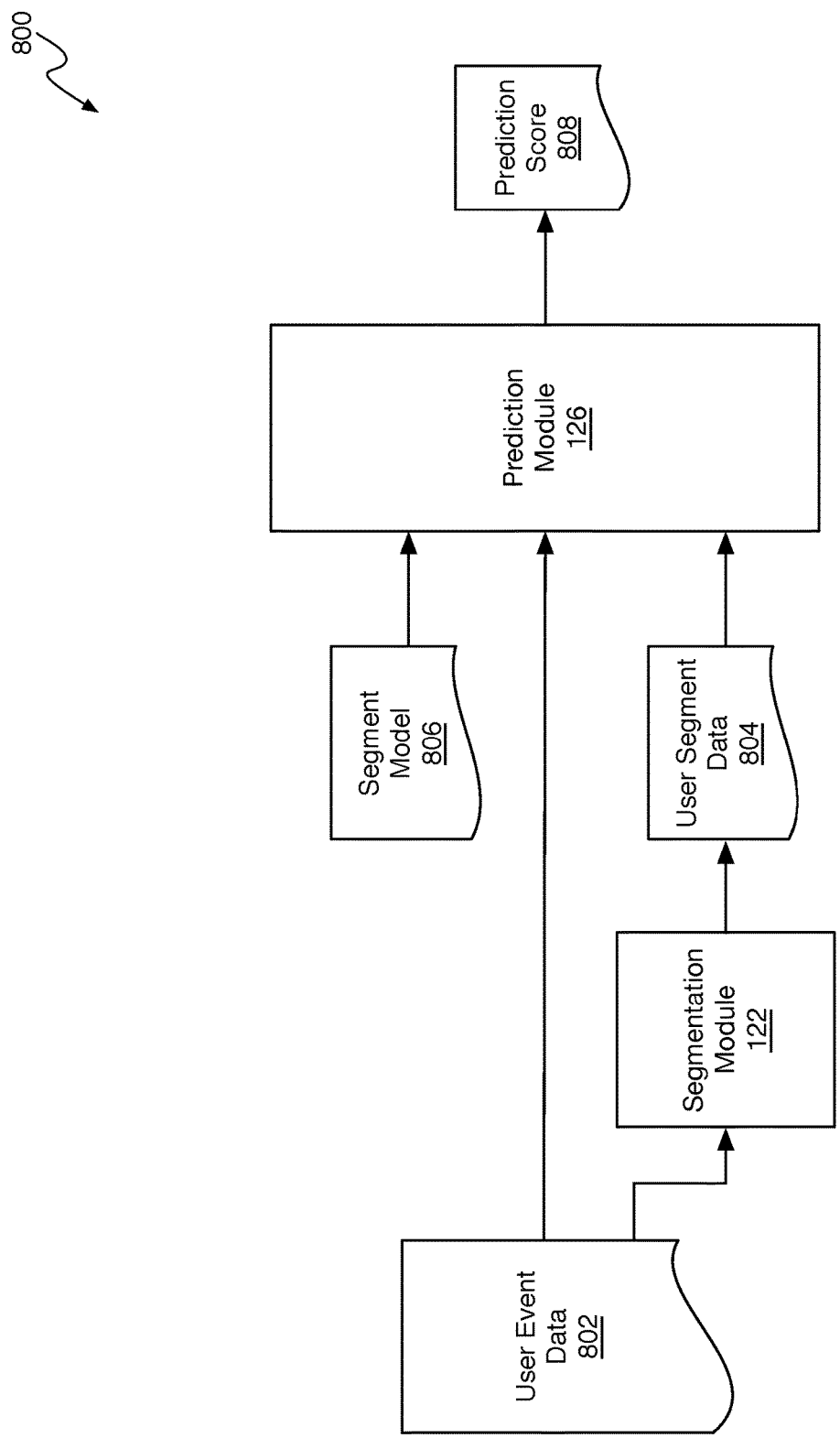
FIG. 8 is a block diagram of an example system for predicting user engagement segment transitions based on predictive segment models.

FIG. 8 is a block diagram of an example system 800 for predicting user engagement segment transitions based on predictive segment models. For example, system 800 can correspond to analytics server 120 of FIG. 1. In some implementations, prediction module 126 can predict future user behaviors (e.g., user engagement segment transitions) based on user event data 110 reported by user device 102 to analytics server 120 and the prediction models generated and/or trained by model generator 124. While model generator 124 uses user event data received from many different user devices associated with many different users (e.g., user identifiers) to generate and/or train the prediction models, prediction module 126 uses user event data associated with a single particular user identifier and the prediction models to generate a prediction regarding whether the user associated with the particular user identifier is likely to transition from a current user engagement segment to another user engagement segment. These predictions can then be used to configure news application 104 so that news application 104 presents content in such a way as to increase and/or maintain the particular user's engagement with (e.g., use of) news application 104.

In some implementations, segmentation module 122 can receive user event data 802 associated with a particular user. For example, user event data 802 can correspond to user event data 110 described above. User event data 802 may be reported by different user devices 102 associated with the same user (e.g., user identifier). Segmentation module 122 can determine user engagement segments (e.g., engagement source segments, engagement lifecycle segments, etc.) associated with the user, as described above with reference to FIG. 4 and FIG. 5. After determining which user engagement segments the user is associated with, segmentation module 122 can send user segment data 804, including identifiers for the user engagement segments associated with the user, to prediction module 126.

After receiving user segment data 804, prediction module 126 can obtain segment model 806. For example, segment model 806 can correspond to segment models 614, 616, 618, or any of the models described with reference to FIG. 7. Segment model 806 can correspond to additional and/or different segment models not shown. Prediction module 126 can select segment model 806 based on user segment data 804. For example, a segment model can model a user engagement segment transition from a starting segment to an ending segment, as described above. Prediction module 126 can select a segment model that has a starting user engagement segment, or segments, that correspond to one or more of the user engagement segments (or combinations of user engagement segments) identified in user segment data 804.

As illustrated by FIG. 7, a single starting user engagement segment may have more than one predictive segment model associated with the starting user engagement segment. For example, medium user engagement segment 730 may be associated with upward migration model 732, downward migration model 734, and/or churn model 736. When generating predictions for a particular user, prediction module 126 can process user event data 802 through each prediction model associated with the starting user engagement segment to generate predictions for each type of transition that can be made from the starting user engagement segment.

When user event data 802 is processed by prediction module 126 using segment model 806, prediction module 126 can generate a prediction score 808. For example, the prediction score can indicate the likelihood that the user will perform the user engagement segment transition modeled, or predicted by, segment model 806. For example, prediction score 808 can generate a score that indicates the likelihood that the user is likely to adopt, likely to migrate up, likely to migrate down, and/or likely to churn. When the prediction score is above a threshold value (e.g., 9 on a scale of 1-10), then prediction module 126 can determine that the user is associated with the likely to adopt 444, likely to migrate up 446, likely to migrate down 448, and/or likely to churn 450 user engagement segments. As described above, other predictive models can be generated and other predictions can be made by prediction module 126 using the predictive models. The above description merely provides some specific examples of some predictions that can be made by prediction module 126 using segment model 806.

Referring back to FIG. 1, after prediction module 126 determines with which prediction-based user engagement segments the user is associated, analytics server 120 can send user segment identifiers 128 to news server 140. For example, user segment identifiers 128 can include identifiers for all of the user engagement segments 420 associated with a user (e.g., user identifier). User segment identifiers 128 can, for example, include a mapping of user identifier to each user engagement segment associated with the user identifier. When news server 140 receives user segment identifiers 128, news server 140 can store the user segment identifiers 128 in user segments database 148. For example, user segments database 148 can store, for each user identifier, a mapping of the user identifier to user engagement segments associated with the user identifier, as determined by analytics server 120.

Generating Application Configurations

Figure 9:
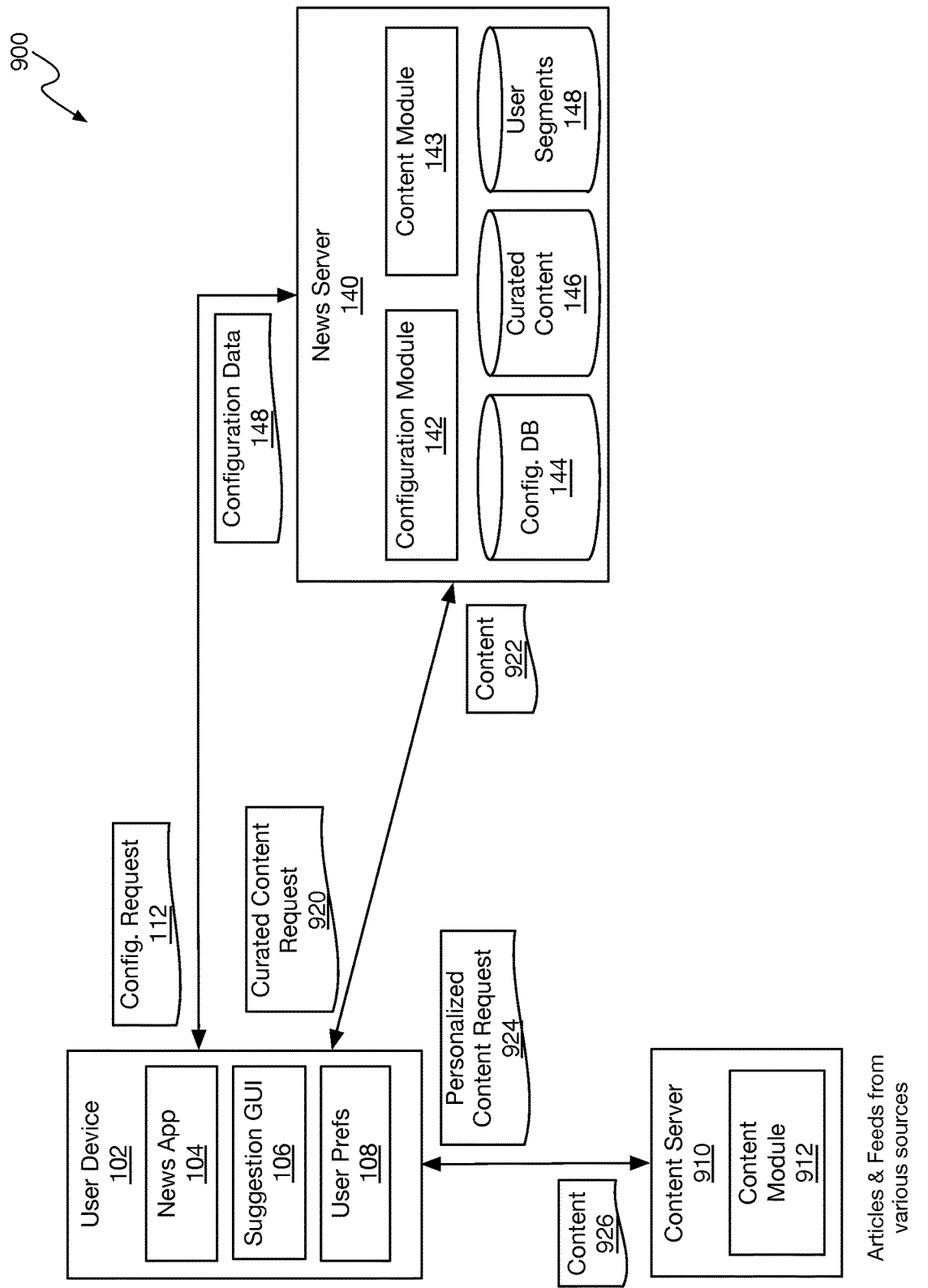
FIG. 9 is a block diagram of an example system for generating application configurations based on user engagement segments.

FIG. 9 is a block diagram of an example system 900 for generating application configurations based on user engagement segments. For example, system 900 can correspond to system 100, described above.

In some implementations, system 900 can include news server 140. For example, news server 140 can be a computing device that manages configurations for news application 104 and/or suggestion GUI 106. News server 140 can communicate with user device 102 and/or content server 910 through a network (e.g., local area network, wide area network, Wi-Fi network, cellular data network, the Internet, etc.).

In some implementations, news server 140 can include configuration module 142. For example, configuration module 142 can generate and/or serve application configuration data to news application 104 and/or suggestion GUI 106. News server 140 can include application configuration database 144. For example, application configuration database 144 can store application configuration data, or portions thereof, associated with each user engagement segment 420. For example, different application configuration data can be created for each particular user engagement segment, or combination of segments, to encourage or entice users associated with the user engagement segments to maintain and/or increase their engagement with news application 104. Stated differently, the configuration for each engagement segment can be configured to serve content to users in each engagement segment that is specifically tailored to the engagement segments with which the users are associated so that the users are presented with content that keeps the users interested in news application 104. In some implementations, the application configuration data associated with a particular user engagement segment may be different than the application configuration data associated with other user engagement segments. Thus, users associated with different user engagement segments may be presented with different content when interacting with news application 104.

Figure 10:
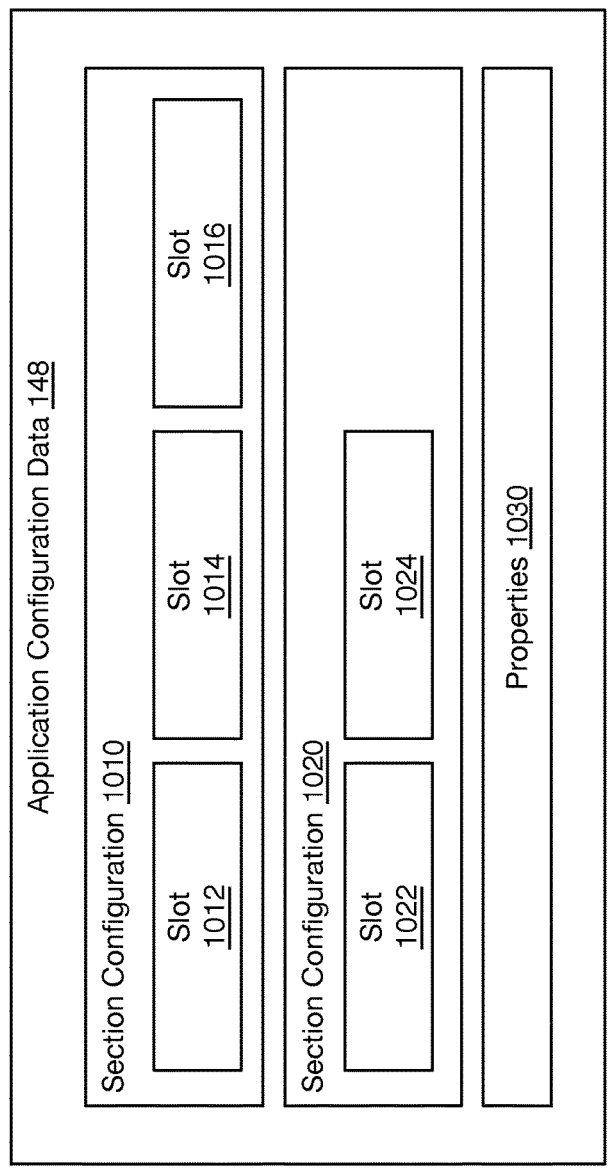
FIG. 10 is a conceptual diagram of application configuration data for news application 104.

FIG. 10 is a conceptual diagram 1000 of application configuration data for news application 104. In some implementations, the application configuration data can specify how content items and/or content item suggestions are presented in news application 104 and/or suggestion GUI 106. The application configuration data can specify the number of content sections (1010, 1020), the number of content items (e.g., 1012, 1014, 1016, 1022, 1024, etc.) per section, content item topics, etc., to present to the user through news application 104 and/or suggestion GUI 106.

The application configuration data can specify the layout, order, and/or organization of content sections (e.g., 1010, 1020, etc.), content items (e.g., 1012, 1014, 1016, 1022, 1024, etc.), content item topics, etc., presented by news application 104 and/or suggestion GUI 106. The application configuration data can specify which content item sections (e.g., curated sections, personalized sections, etc.) are presented to the user. For example, curated sections can include curated content selected by content curators (e.g., people) associated with news server 140. Curated sections can include "Top Stories," "Trending," and/or other curated sections. Personalized sections can include "For You," and/or sections related to particular topics that the user has indicated an interest in (e.g., as indicated in user preferences 108).

In some implementations, the application configuration data specify rules that determine how news application 104 and/or suggestion GUI 106 select and/or obtain content items and/or content item suggestions. For example, each content item slot (e.g., 1012, 1014, 1016, 1022, 1024, etc.) in application configuration data 148 can include a set of rules for how to select content items from different content providers (e.g., publishers) based on different or various criteria. For example, news application 104 can select content item sources (e.g., publishers, news feeds, content item collections, etc.), content items, and/or content item suggestions based on a variety of properties 1030 that can be specified in the application configuration data. Each of the properties can be adjusted for different user engagement segments so that users associated with the different user engagement segments are presented with content items, content item suggestions, and/or content item sources that are likely to maintain or increase the users' engagement with news application 104. In short, properties 1030 can be adjusted so that the user is presented with content that makes the users' interactions with news application 104 more enjoyable and causes the user to return to news application 104 to consume more content.

In some implementations, the application configuration data properties 1030 can include a publisher threshold score. For example, each content publisher can be scored according to popularity, brand awareness, reputation, and/or other factors. Users associated with the new user engagement segment 428 may be more interested in well-known publishers and therefore configuration data associated with new user engagement segment 428 may have a high publisher threshold score (e.g., above a threshold value). Users associated with the high user engagement segment 442 may be more interested in a diverse selection of publishers and therefore configuration data associated with new high engagement segment 422 may have a low publisher threshold score (e.g., below a threshold value).

In some implementations, the application configuration data properties 1030 can include a diversity factor. For example, the diversity factor can be a number or a score that indicates how diverse the content sources should be for a particular user engagement segment. For example, if the diversity factor is high (e.g., above a threshold value), then news application 104 can obtain content items from a greater number of different content sources or publishers. If the diversity factor is low (e.g., below a threshold value), then news application 104 can obtain content items from a more select, less diverse number of different content sources or publishers. For example, new segment 428 may be associated with application configuration data having a low diversity factor, while high segment 442 may be associated with application configuration data having a high diversity factor.

In some implementations, the application configuration data properties 1030 can include a subscription coefficient. For example, the subscription coefficient can be a number or score indicating how much weight to give explicitly favorited content publishers, topics, etc., in user preferences 108 when selecting content to present to the user. For example, if the subscription coefficient is high (e.g., above a threshold value), then news application 104 can obtain a greater number of content items associated with topics and/or content publishers that the user has favorited. If the subscription coefficient is low (e.g., below a threshold value), then news application 104 can obtain a greater number of content items associated with topics and/or content publishers that the user has not explicitly favorited. For example, new segment 428 may be associated with application configuration data having a high subscription coefficient, while high segment 442 may be associated with application configuration data having a low subscription coefficient.

In some implementations, the application configuration data properties 1030 can include a personalization coefficient. For example, the personalization coefficient can be a number or score indicating how much weight to give content publishers, topics, etc., that the user has an affinity for, as determined based on the user's historical content consumption patterns when selecting content to present to the user. For example, if the personalization coefficient is high (e.g., above a threshold value), then news application 104 can obtain a greater number of content items associated with topics and/or content publishers for which the user has an affinity towards. If the subscription coefficient is low (e.g., below a threshold value), then news application 104 can obtain a greater number of content items associated with topics and/or content publishers that the user has not favorited. For example, new segment 428 or low segment 438 may be associated with application configuration data having a low personalization coefficient, while high segment 442 may be associated with application configuration data having a high personalization coefficient.

In some implementations, the application configuration data properties 1030 can include a diversification factor. For example, the diversification factor can be a number or score indicating how diverse the content topics and/or content sources (e.g., publishers) from which news application 104 selects content should be. For example, if the diversification factor is high (e.g., above a threshold value), then news application 104 can obtain a greater number of content items associated with a greater number of different of topics and/or content publishers. If the diversification factor is low (e.g., below a threshold value), then news application 104 can obtain a greater number of content items associated with a small number of topics and/or content publishers that the user is known to enjoy. For example, new segment 428 or low segment 438 may be associated with application configuration data having a low diversification factor, while high segment 442 may be associated with application configuration data having a high diversification factor.

Returning to FIG. 9, in some implementations, news application 104 on user device 102 can request application configuration data for news application 104 from news server 140. For example, news application 104 can send configuration request 112 to news server 140. Configuration request 112 can include a user identifier (e.g., the anonymous user identifier) for the user of user device 102. News server 140 can process configuration request 112 as illustrated by the detailed system diagram of FIG. 10.

Figure 11:
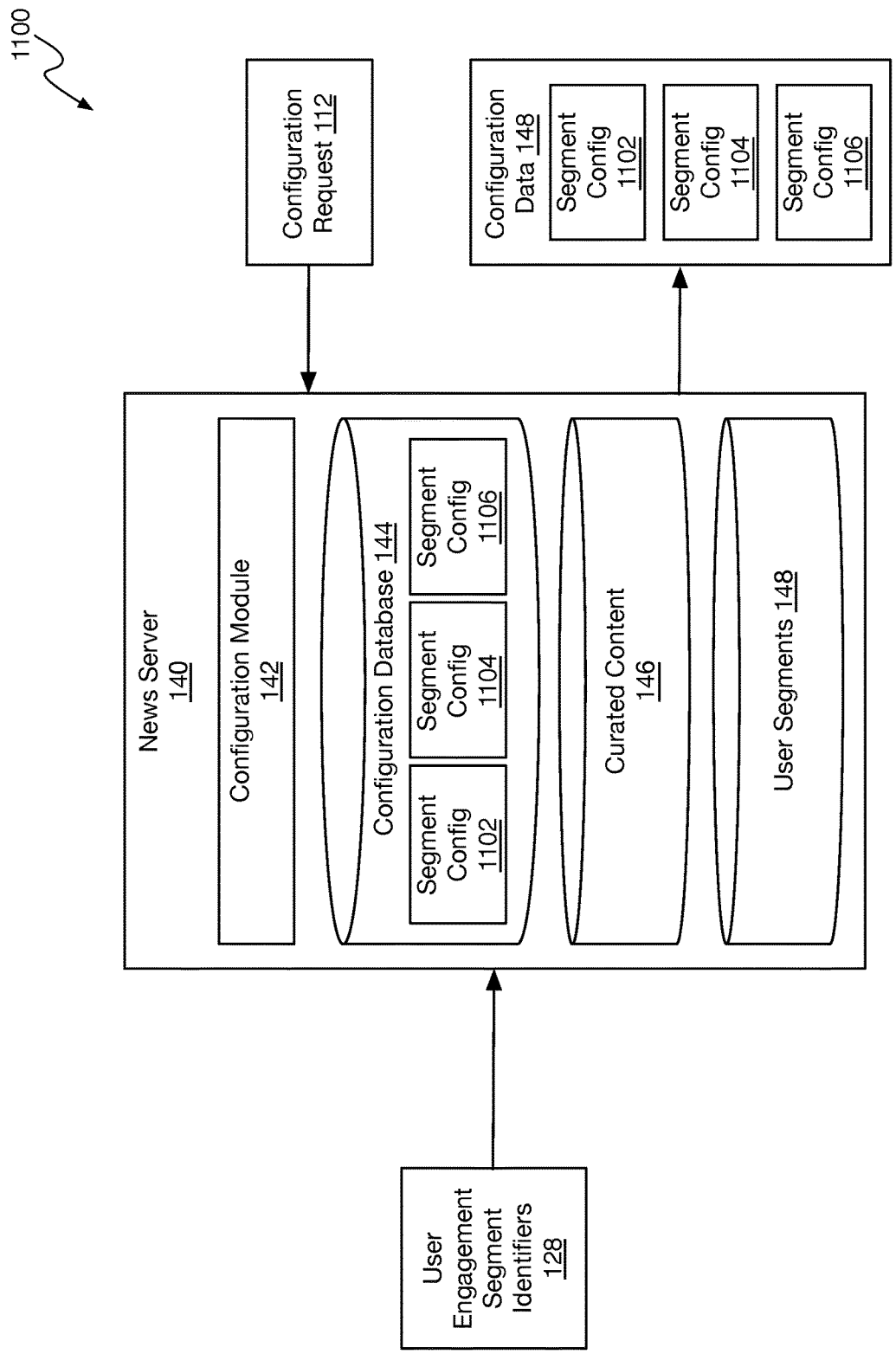
FIG. 11 is a block diagram of a system for generating application configuration based on user engagement segments.

FIG. 11 is a block diagram of a system 1100 for generating application configuration based on user engagement segments. For example, system 1100 can correspond to system 900. When news server 140 receives configuration request 112, configuration module 142 on news server 140 can obtain the user engagement segment identifiers associated with the user identifier in configuration request 112 from user segments database 148. As described above, user segments database 148 can store a mapping between user identifiers and user engagement segments associated with the user identifiers. Thus, configuration module 142 can obtain the user engagement segment identifiers associated with the user of user device 102 based on (e.g., indexed by) the user identifier received in configuration request 112.

After obtaining the user engagement segment identifiers associated with the user of user device 102, configuration module can obtain the application configuration data associated with each of the user engagement segment identifiers from configuration database 144. For example, configuration database 144 can store a mapping of user engagement segment identifiers to corresponding configurations (e.g., segment configuration 1102, segment configuration 1104, segment configuration 1106, etc.). Configuration module 142 can obtain individual segment configurations corresponding to the segment identifiers obtained from user segments database 148. For example, if the user identifier is associated with adopted segment 438, medium segment 440, and likely to migrate up segment 446, then configuration module 142 can obtain segment configuration 1102, 1104, and 1106 associated with these user engagement segments.

After obtaining the segment configurations 1102, 1104, and/or 1106 for the user of user device 102, configuration module 142 can combine the segment configurations into application configuration data 148. For example, configuration database 144 may include a default configuration for news application 104. The segment configurations 1102, 1104, and/or 1106 may be combined with (e.g., override portions of) the default configuration to generate application configuration data 148 that is specifically tailored to the user of user device 102.

Returning to FIG. 9, after generating application configuration data 148, news server 140 can send application configuration data 148 to news application 104 on user device 102. News application 104 can configure news application 104 and/or suggestion GUI 106 based on the received application configuration data 148. For example, news application 104 can obtain content items for presentation by news application 104 and/or suggestion GUI 106 based on the rules specified in the received application configuration data 148.

In some implementations, configuration data 148 can specify that news application 104 should obtain curated content items. For example, a content item slot in a curated section (e.g., "Top Stories,", "Trending," etc.) can include a rule that causes news application 104 to obtain a content item curated by a curator associated with news server 140. To obtain the curated content item, news application 104 can send a curated content request 920 to news server 140 that specifies parameters (e.g., section type, sorting order, number of items to return, whether to return a score for the content item, etc.) for obtaining or selecting a curated content item. Content module 143 on news server 140 can query curated content database 146 to obtain content items based on the parameters specified in the curated content request 920. After obtaining the curated content items from curated content database 146, content module 143 can send the curated content items to news application 104 in content message 922.

In some implementations, configuration data 148 can specify that news application 104 should obtain personalized content items. For example, a content item slot in a personalized section (e.g., "For You,", favorited publishers, favorited topics, etc.) can include a rule that causes news application 104 to obtain content items from content server 910. For example, content server 910 can be a computing device (e.g., edge server, part of a content distribution network, etc.) that serves content items and/or content item feeds from various content publishers to news application 104. To obtain the personalized content item, news application 104 can send a personalized content request 924 to news server 140 that specifies parameters (e.g., section type, sorting order, number of items to return, whether to return a score for the content item, topic identifier, publisher identifier, etc.) for obtaining or selecting personalized content items. Content module 912 on content server 910 can query the various content item feeds, content item listings, content item publishers, etc., to obtain content items based on the parameters specified in the personalized content request 924. After obtaining the personalized content items, content module 912 can send the personalized content items to news application 104 in content message 926.

After obtaining the content items (e.g., personalized content items, curated content items, etc.), news application 104 can present the content items, or metadata representing the content items, on GUI 200 or GUI 300, described above or GUI 1200 described with reference to FIG. 12 below.

Multilevel Configuration Data

Figure 12:
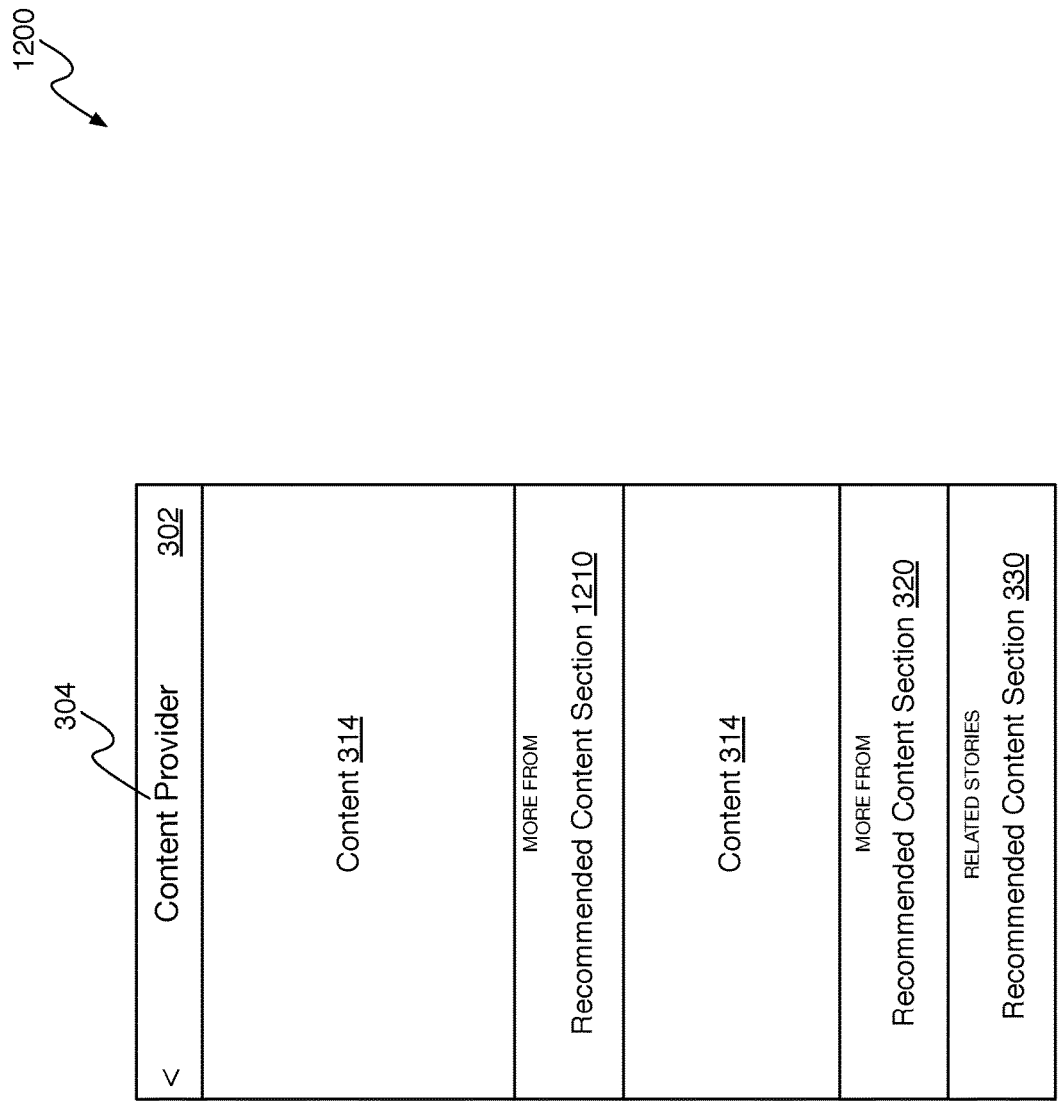
FIG. 12 illustrates an example graphical user interface configured using multilevel configuration data.

FIG. 12 illustrates an example graphical user interface 1200 configured using multilevel configuration data. For example, GUI 1200 can correspond to GUI 300 of FIG. 3, described above. However, GUI 1200 can include an additional content item recommendation section 1210 positioned in within content 314. By presenting recommended content section 1210 within content 314, recommended content section 1210 may be more visible to the user and, therefore, the user may be more likely to select another article to consume while using news application 104. For example, recommended content section 1210 can present content items (e.g., representations of content items) based on the user's personal preferences 108 and/or content items from the same content publisher as content 1210.

In some implementations, recommended content section 1210, recommended content section 320, and/or recommended content section 330 may be dynamically configured using multilevel configuration data. For example, in addition to (or instead of) selecting and/or obtaining content based on application configuration data (e.g., application level configuration) received from news server 140, as described above, content presented in recommended content section 1210, recommended content section 320, and/or recommended content section 330, may be selected and/or obtained by news application 104 based on configuration data, or partial configuration data, associated with content publishers (e.g., publisher level configuration), and/or individual content items (e.g., content level configuration). The configuration data associated with the different levels can be combined to generate a dynamic configuration that can be dynamically modified (e.g., in real time) as configuration data associated with the various levels is received and/or as content items are obtained and/or presented by news application 104.

Figure 13:
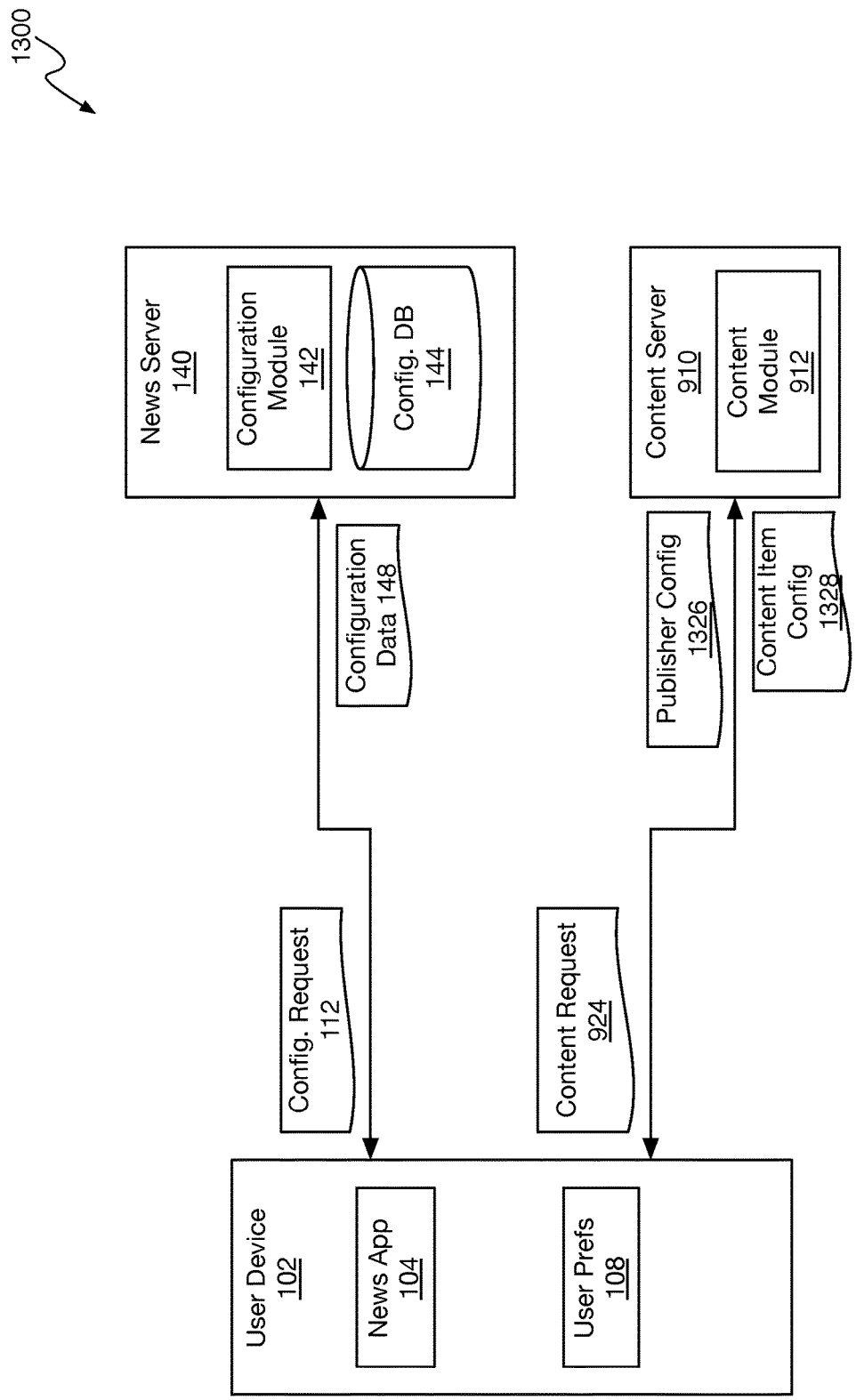
FIG. 13 is a block diagram of an example system for configuring applications using multilevel configuration.

FIG. 13 is a block diagram of an example system 1300 for configuring applications using multilevel configuration. For example, system 1300 can correspond to system 900, described above. As described above, news application 104 can send configuration request 112 to news server 140. In response to receiving configuration request 112, configuration module 142 can generate configuration data 148 (e.g., application level configuration) based on the user engagement segments associated with the user of user device 102. After generating configuration data 148, configuration module 142 can send the configuration data 148 to user device 102. News application 104 can then user configuration data 148 as the baseline (e.g., default) configuration for news application 104, as described above.

In some implementations, news application 104 can receive publisher configuration data 1326. For example, publisher configuration data 1326 can correspond to publisher level configuration that provides a mechanism for content publishers to dynamically change the configuration of news application 104 whenever news application presents a content item provided with the content publisher. Thus, news application 104 may receive different publisher configuration data 1326 for different content item publishers.

When news application 104 sends a content request 924 to content server 910 to obtain content items, or content item metadata, associated with a particular publisher, content server 910 can obtain publisher configuration 1326 (e.g., publisher level configuration) corresponding to the particular publisher and send publisher configuration data 1326 to news application 104. For example, a content publisher or provider (not shown) can provide publisher configuration data 1326 to content server 910 so that content server can serve publisher configuration data 1326 to news application 104 on user device 102. Publisher configuration data 1326 can be formatted similarly to application configuration data 148 and can include the same types of data as application configuration data 148. However, publisher configuration data 1326 may include just a portion (e.g., less than all) of the configuration data included in application configuration data 148. For example, publisher configuration data 1326 may provide different values for specific properties and/or different rules for specific content item slots or sections but may not include values, properties, and/or rules for every configurable item in application configuration data 148.

In some implementations, publisher configuration data 1326 can override or replace configuration data in application configuration data 148. For example, publisher configuration data 1326 can change the values of properties in application configuration data 148. Publisher configuration data 1326 can preempt the rules specified for specific content item slots specified in application configuration data 148. Thus, the configuration data specified in the publisher level configuration may be prioritized over the configuration data specified in the application level configuration.

In some implementations, news application 104 can receive content item configuration data 1328. For example, content item configuration data 1328 can correspond to content level configuration that provides a mechanism for content publishers to dynamically change the configuration of news application 104 on a content item by content item basis. Thus, news application 104 may receive different content item configuration data 1328 for different content items published by the same content publisher and/or different content publishers.

When news application 104 sends a content request 924 to content server 910 to obtain content items, or content item metadata, content server 910 can send the content item configuration data 1328 along with a requested content item (e.g., news article, opinion piece, etc.) to news application 104. For example, a content publisher or provider (not shown) can provide the content item and content item configuration data 1328 to content server 910 along so that content server 910 can serve content item configuration data 1328 to news application 104 on user device 102. Content item configuration data 1328 can be formatted similarly to application configuration data 148 and can include the same types of data as configuration data 148. However, content item configuration data 1328 may include just a portion (e.g., less than all) of the configuration data included in configuration data 148. For example, content item configuration data 1328 may provide different values for specific properties and/or different rules for specific content item slots or sections but may not include values, properties, and/or rules for every configurable item in application configuration data 148.

In some implementations, content item configuration data 1328 can override or replace configuration data in application configuration data 148 and/or publisher configuration data 1326. For example, content item configuration data 1328 can change the values of properties in application configuration data 148 and/or publisher configuration data 1326. Content item configuration data 1328 can preempt the rules specified for specific content item slots specified in application configuration data 148 and/or publisher configuration data 1326. Thus, the configuration data specified in the article level configuration may be prioritized over the configuration data specified in the application level configuration and/or publisher level configuration.

Figure 14:
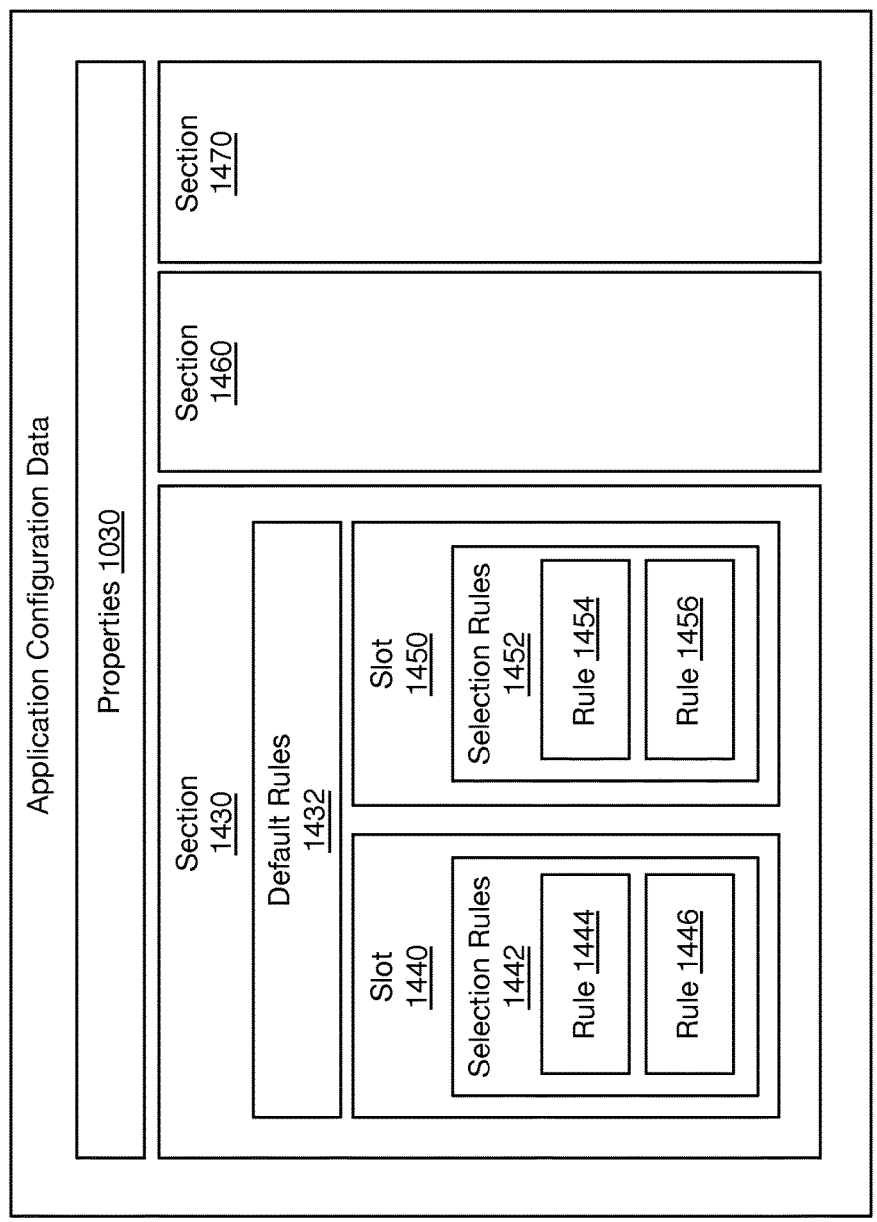
FIG. 14 is a block diagram illustrating an example application level configuration data.

FIG. 14 is a block diagram illustrating an example application level configuration data 1400. For example, application level configuration data can correspond to application configuration data 148 described above.

In some implementations, application configuration data 1400 can include section configuration data 1430. Sections 1460 and 1470 can be configured similarly to section 1430. For example, section configuration data 1420 can define the number of content item slots to be presented in a content item section presented by news application 104. Section configuration data 1430 can include default rules 1432 for selecting and/or obtaining content items.

Content Selection Rules

In some implementations, a rule can specify default content providers and/or default content item selection criteria for the corresponding content item section. For example, a rule can include a content provider identifier. For example, the content provider identifier corresponding to a content publisher, news feed, article list, etc.

A rule can include a content item score threshold value that can be used to select or filter content items. For example, content items received by news application 104 can include metadata that includes a scores for the content items. News application 104 can filter out content items that have scores that fall below the threshold value when selecting content items to present to the user.

A rule can include a weighted content item score threshold value that can be used to select or filter content items. For example, content items received by news application 104 can include metadata that includes scores (e.g., determined by curators associated by news server 140) for the content items. News application 104 can generate affinity scores for content items based on user preferences 108. News application 104 can generate a weighed content item score for a content item based on both the metadata score (m_score) and the affinity score (a_score) for the content item. For example, the weighted score can be generated according to the following equation: w1*m_score+ w2*a_score, where w1 and/or w2 are determined based on the personalization coefficient, the subscription coefficient, and/or the diversification factor, as described above. News application 104 can filter out content items that have weighted scores that fall below the weighted score threshold value when selecting content items to present to the user.

A rule can include an order or sorting parameter for content items. For example, news application 104 can send the sorting parameter (e.g., sort by date, sort by personalization criteria, sort by article score, etc.) to news server 140 and/or content server 910 when requesting content items. When news server 140 and/or content server 910 send the requested content items to news application 104, news server 140 and/or content server 910 can provide the content items ordered by the sorting parameter.

A rule can include filtering options. The filtering options can include a "seen" filter to filter out content items where the user has already seen a title, headline, or other metadata associated with the content items. The filtering options can include a "read" filter to filter out content items where the user has already read the content of the content items. For example, when requesting content items from news server 140 and/or content server 910, news application 104 can provide the filtering options specified by the rule so that news server 140 and/or content server 910 can filter content items before sending the content items to news application 104.

In some implementations, section configuration data 1430 can include slot configuration 1440 and/or 1450. For example, each slot configuration can be configured with selection rules 1442 and/or 1454 that can define or determine how content items are selected for the corresponding content item slot when content section corresponding to section 1430 is presented by news application 104. Selection rules 1442 and/or 1452 can include an ordered collection of rules. For example, selection rules 1442 can include rule 1444 and/or rule 1446. Selection rules 1452 can include rule 1454 and/or rule 1456. Rules 1444, 1446, 1454, and/or 1456 can override default rules 1432. For example, to select or obtain a content item for slot 1440, news application 104 can analyze selection rules 1442 in order until a content item is obtained or selected for content item slot 1440. If none of the rules in selection rules 1442 results in a selection of a content item, a content item can be selected for slot 1440 using the rules in default rules 1432. A similar process can be followed when selecting content items for slot 1450.

Other aspects and/or features of application configuration data 1400 may be described in the sections above. For example, application configuration data 1400 can include any of the properties 1030 described above with reference to FIG. 10.

Figure 15:
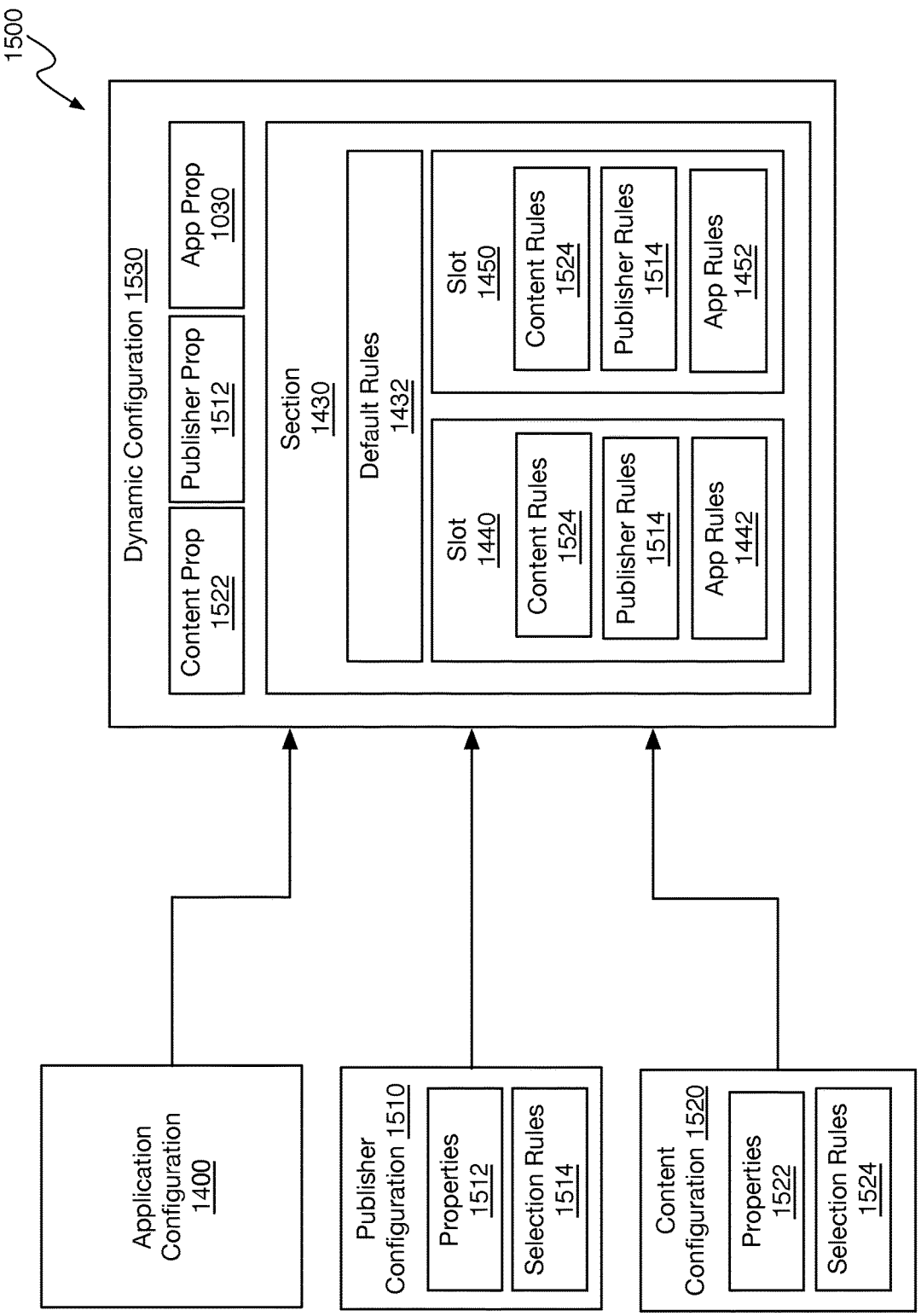
FIG. 15 is a block diagram illustrating merging application level configuration, publisher level configuration, and article level configuration into dynamic configuration.

FIG. 15 is a block diagram 1500 illustrating merging application level configuration 1400, publisher level configuration 1510, and article level configuration 1520 into dynamic configuration 1510. For example, when news application 104 receives publisher level configuration 1510 and/or content level configuration 1520, news application 104 can merge publisher level configuration 1510 and/or content level configuration 1520 with application level configuration 1400 to generate dynamic configuration 1530.

In some implementations, publisher level configuration data 1510 can include the same or similar configuration data as application level configuration data 1400. For example, publisher level configuration data 1510 can include properties 1512 (e.g., similar to properties 1030) and selection rules 1514 (similar to selection rules 1442) for configuring news application 104. However, publisher level configuration 1510 data may not include all of the configuration data required by news application 104. For example, publisher level configuration data 1510 may merely change specific properties, rules, variables, data, etc., defined within application configuration 1400.

In some implementations, content level configuration data 1520 can include the same or similar configuration data as application level configuration data 1400 and/or publisher level configuration data 1510. For example, content level configuration data 1520 can include properties 1522 (e.g., similar to properties 1030) and selection rules 1524 (similar to selection rules 1442) for configuring news application 104. Moreover, content level configuration data 1520 can turn on and off features of news application 104, rename content sections, specify specific articles to present to the user, and/or specify other configurations for news application 104. However, content level configuration data 1520 may not include all of the configuration data required by news application 104. For example, content level configuration data 1520 may merely change specific properties, rules, variables, data, etc., defined within application configuration 1400.

As described above, content level configuration 1520 can override publisher configuration 1510 and application 1400. Publisher level configuration 1510 can override application configuration 1400. In some instances, this overriding or priority mechanism can be implemented by replacing configuration data when merging application configuration data 1400, publisher configuration data 1510 and/or content configuration 1520 to generate dynamic configuration data 1530. For example, the values of properties defined in application configuration 1400 and/or publisher configuration 1510 can be replaced by the property values defined in content configuration 1520 when merging the configurations into dynamic configuration 1530. In some instances, this overriding or priority mechanism can be implemented by ordering configuration data based on priority when merging application configuration data 1400, publisher configuration data 1510 and/or content configuration 1520 to generate dynamic configuration data 1530. For example, when merging rules defined for a particular content slot, rules defined by content level configuration data 1520 can be ordered such that they are evaluated before rules defined by publisher level configuration data 1510 and rules defined by publisher configuration data 1510 can be ordered such that they are evaluated before rules defined by application configuration data 1400.

In some implementations, higher level configuration data can refer to lower level configuration data. For example, application configuration data 1400 may refer or include an undefined publisher identifier (e.g., content source identifier), property, content item type, or other configuration data or variable. For example, a rule defined by application configuration data 1400 for a content item slot may identify a content source that is undefined or unknown to news application 104. If a definition for the content source is unavailable, then news application 104 can iterate through the other rules for the content item slot until a content item is obtained for the content item slot.

However, in some cases, the undefined publisher identifier, property, content item type, or other data reference can be defined by a lower level configuration data (e.g., publisher level configuration data 1510, content level configuration data 1520). In this case, news application 104 can evaluate the undefined configuration item that was not defined at the application level configuration 1400 based on the definition for the configuration item provided by the publisher level configuration data 1510 or content level configuration data 1520. Thus, news application 104 can be dynamically configured based on configuration items that are dynamically defined as content items are received by news application 104.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 16:
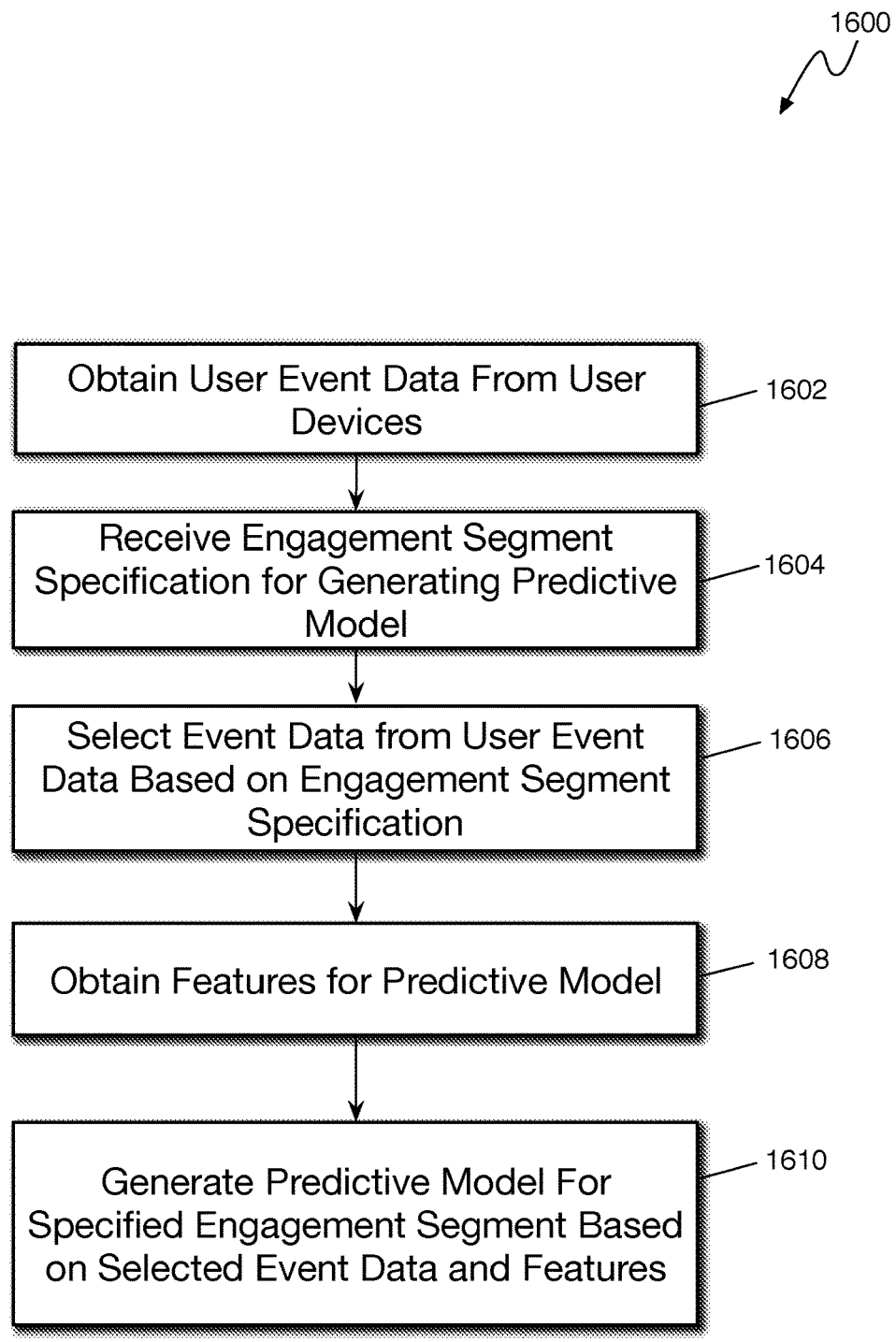
FIG. 16 is flow diagram of an example process for generating user models based on user engagement segments.

FIG. 16 is flow diagram of an example process 1600 for generating user models based on user engagement segments. For example, process 1600 can be performed by analytics server 120 of system 100, as described above.

At step 1602, analytics server 120 can obtain user event data from user devices. For example, analytics server 120 can receive user event data describing the behavior and interactions of users with respect to news applications 104 on user devices 102. For example, the user event data can describe content sources and/or content topics associated with content items that the users have seen or consumed through news applications 104. The user event data can describe the amount of time that users have spent consuming content presented by news application 104. The user event data can describe other user behaviors, as described above.

At step 1604, analytics server 120 can receive an engagement segment specification for generating a predictive model. For example, analytics server 120 can receive an engagement segment specification that defines a starting user engagement segment and an ending user engagement segment. For example, the starting user engagement segment and the ending user engagement can define a user engagement segment (e.g., user engagement lifecycle) transition that can be used to predict future user behavior, as described above.

At step 1606, analytics server 120 can select event data from the received user event data based on the engagement segment specification. For example, analytics server 120 can generate user base tables for training the predictive model based on the engagement segment specification. Analytics server 120 can select event data corresponding to users (e.g., user identifiers) who have transitioned from the starting user engagement segment to the ending user engagement segment for inclusion in the user base table for the predictive model, as described above.

At step 1608, analytics server 120 can obtain features for the predictive model. For example, analytics server 120 can obtain features for the predictive model from a feature specification defined by an administrator user of analytics server 120. The features can correspond to user behaviors that are predictive of the transition from the starting user engagement segment to the ending user engagement segment, as described above.

At step 1610, analytics server 120 can generate the predictive model for the specified engagement segment based on the selected event data and the features. For example, analytics server 120 can generate and/or train a random forest model that is predictive of a user's transition from the starting user engagement segment to the ending user engagement segment using the features and selected event data.

Figure 17:
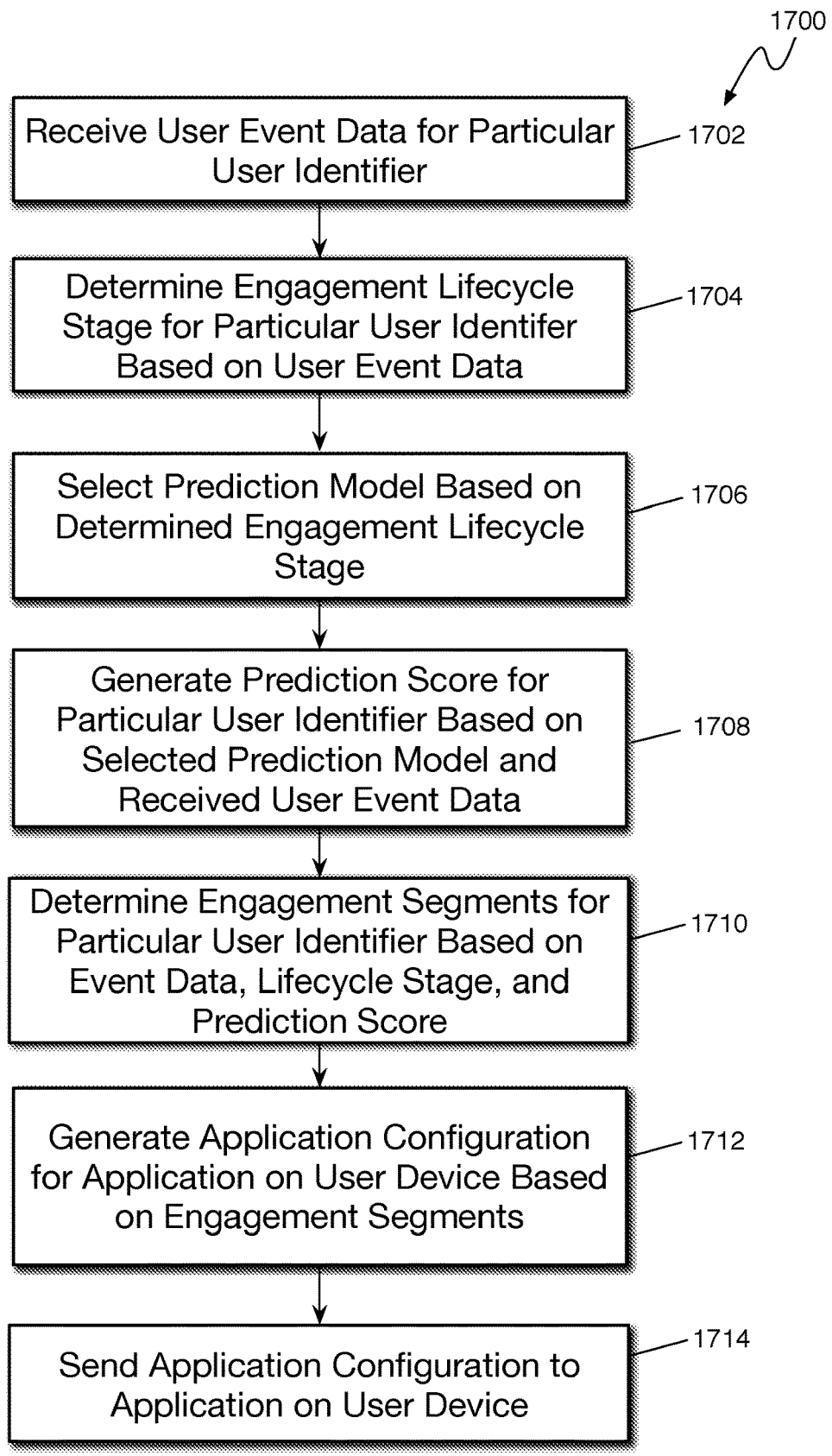
FIG. 17 is flow diagram of an example process for segmenting users based on user engagement.

FIG. 17 is flow diagram of an example process 1700 for segmenting users based on user engagement. For example, process 1700 can be performed by analytics server 120 of system 100, as described above.

At step 1702, analytics server 120 can receive user event data associated with a particular user identifier. For example, news application 104 on user device 102 can collect data describing user activities and/or behavior (e.g., user events) during the user's use (e.g., engagement) with news application 104. News application 104 can report the user event data along with the particular user identifier to analytics server 120.

At step 1704, analytics server 120 can determine a user engagement lifecycle stage for the particular user identifier. For example, analytics server 120 can analyze the user event data by comparing the user event data to rules that define the various an engagement lifecycle stages. Analytics server 120 can determine an engagement lifecycle stage for the for the particular user identifier based on the comparison.

At step 1706, analytics server 120 can select a prediction model for predicting the future behavior of the user associated with the user identifier based on the determined engagement lifecycle stage. For example, analytics server 120 can select prediction models that predict a transition from a starting user engagement lifecycle stage to an ending user engagement lifecycle stage, where the starting user engagement lifecycle stage corresponds to the user engagement lifecycle stage determined for the user.

At step 1708, analytics server 120 can generate a prediction score for the particular user identifier based on a selected prediction model and the received user event data. For example, the prediction model can be used by analytics server 120 to generate a score based on the received user event data that represents the likelihood that the user will transition from the starting user engagement lifecycle stage to the ending user engagement lifecycle stage associated with the selected prediction model.

At step 1710, analytics server 120 can determine user engagement segments for the particular user identifier based on the received user event data, the user's engagement lifecycle stage, and the prediction score. For example, if the prediction score is higher that a threshold prediction score value, then analytics server 120 can determine that the particular user identifier should be associated with a prediction-based user engagement segment. For example, analytics server 120 can determine, based on the prediction score, whether the user should be associated with likely to adopt segment 444, likely to migrate up segment 446, likely to migrate down segment 448, or likely to churn segment 450, as described above.

At step 1712, news server 140 can generate application configuration for news application 104 on user device 102 based on the user engagement segments determined for the user identifier. For example, analytics server 120 can send user engagement segment identifiers corresponding to the user engagement segments determined at step 1710 to news server 140 along with the user identifier. News server 140 can generate application configuration data for news application 104 based on the user engagement segment identifiers.

At step 1714, news server 140 can send the application configuration data to news application 104 on user device 102. For example, news application 104 can use the application configuration data to determine what content to present to the user of user device 102 and how to present the content.

Figure 18:
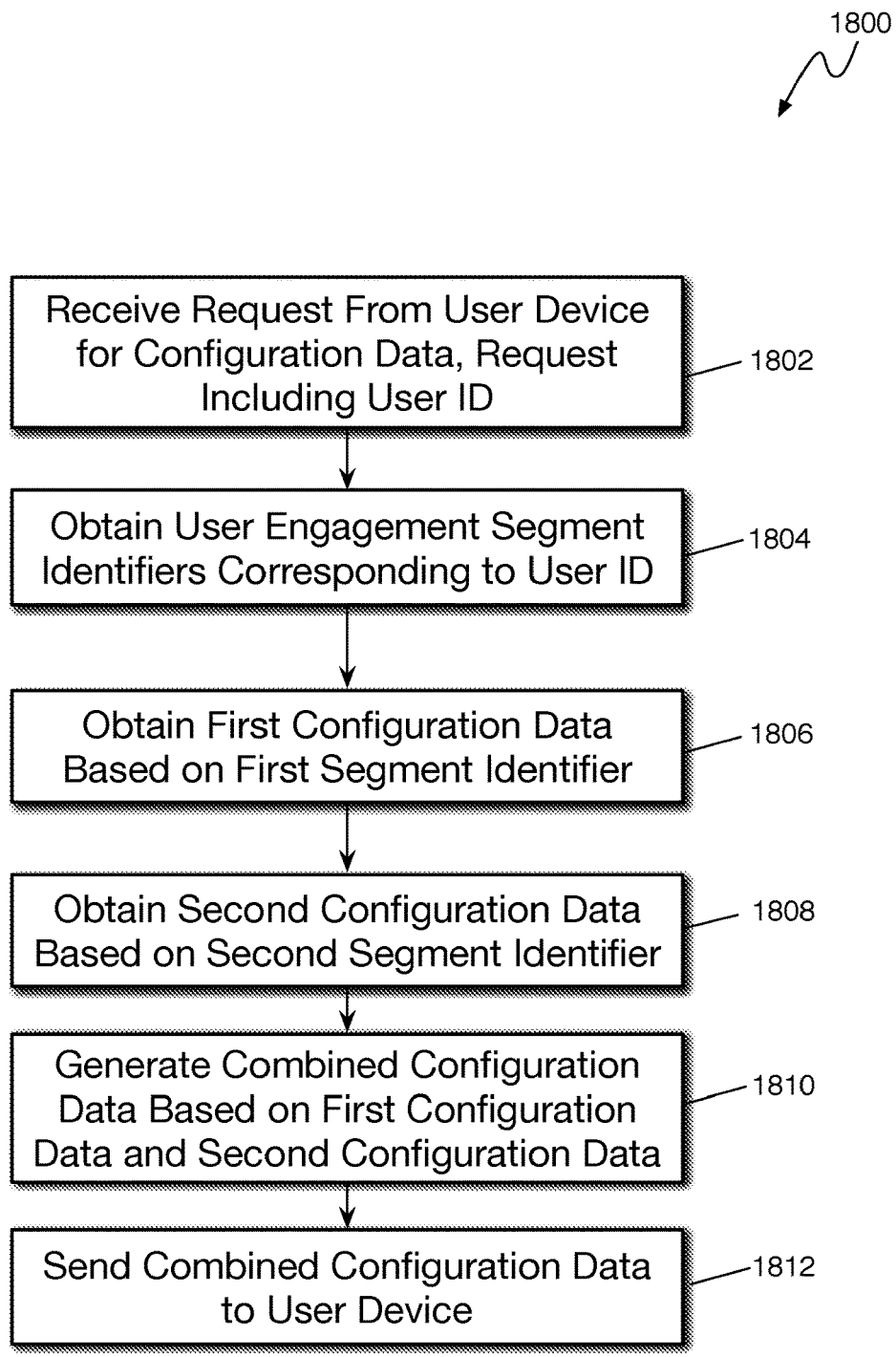
FIG. 18 is flow diagram of an example process for generating application configurations based on user engagement segments.

FIG. 18 is flow diagram of an example process 1800 for generating application configurations based on user engagement segments. For example, process 1800 can be performed by news server 140 of system 100.

At step 1802, news server 140 can receive a request from user device 102 for application configuration data for news application 104. For example, the request can include a user identifier associated with a user of user device 102.

At step 1804, news server 140 can obtain user engagement segment identifiers corresponding to the user identifier received in the request. For example, news server 140 can store a mapping of user engagement segment identifiers to user identifiers, as determined by analytics server 120. News server 140 can compare the user identifier received in the request to the user identifiers in the stored mapping. When news server 140 finds a user identifier in the mapping that matches (e.g., corresponds to) the user identifier received in the request, news server 140 can obtain the user engagement segment identifiers corresponding to the matching user identifier in the mapping.

At step 1806, news server 140 can obtain a first configuration data based on a first segment identifier. For example, news server 140 can store a mapping of user engagement segment identifier to segment configuration data. News server 140 can compare a first segment identifier associated with the user identifier to the segment identifiers in the stored mapping. When news server 140 finds a segment identifier in the mapping that matches (e.g., corresponds to) the first segment identifier, news server 140 can obtain the segment configuration data corresponding to the matching segment identifier in the mapping.

At step 1806, news server 140 can obtain a first configuration data based on a first segment identifier. For example, news server 140 can store a mapping of user engagement segment identifier to segment configuration data for news application 104. News server 140 can compare a first segment identifier associated with the user identifier to the segment identifiers in the stored mapping. When news server 140 finds a segment identifier in the mapping that matches (e.g., corresponds to) the first segment identifier, news server 140 can obtain the segment configuration data corresponding to the matching segment identifier in the mapping.

At step 1808, news server 140 can obtain a second configuration data based on a second segment identifier. For example, news server 140 can store a mapping of user engagement segment identifier to segment configuration data for news application 104. News server 140 can compare a second segment identifier (e.g., different than the first segment identifier) associated with the user identifier to the segment identifiers in the stored mapping. When news server 140 finds a segment identifier in the mapping that matches (e.g., corresponds to) the first segment identifier, news server 140 can obtain the segment configuration data corresponding to the matching segment identifier in the mapping.

At step 1810, news server 140 can generate a combined configuration data for news application 104 based on the first configuration data and the second configuration data. For example, news server 140 can combine the first configuration data and the second configuration data to generate a combined segment-based configuration for news application 104.

At step 1812, news server 140 can send the combined configuration data to news application 104 on user device 102. For example, news application 104 can use the combined configuration data to present graphical user interfaces and/or content items that are configured and/or selected based on the user engagement segments determined for the user of user device 102.

Figure 19:
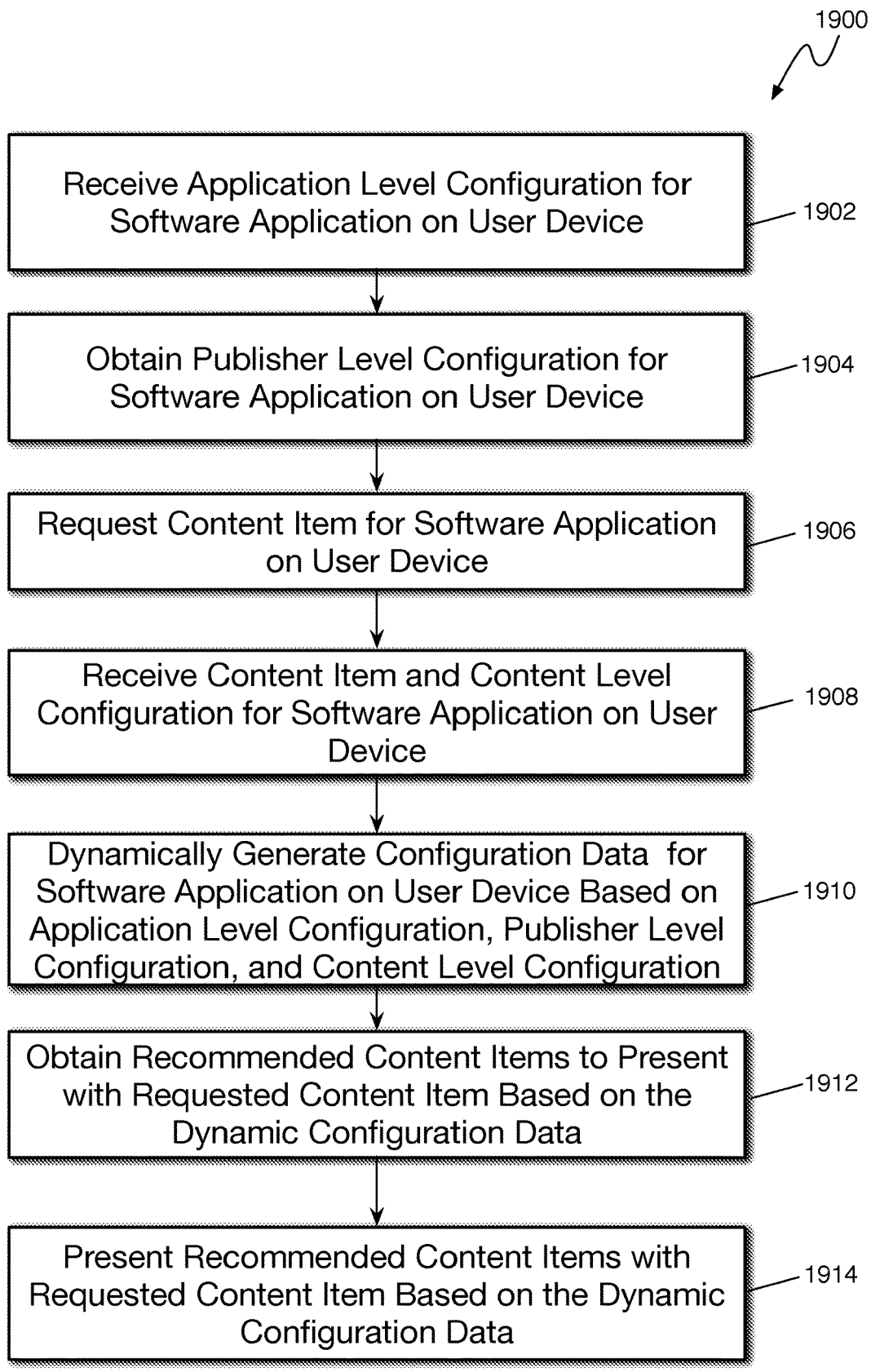
FIG. 19 is flow diagram of an example process for configuring applications using multilevel configuration.

FIG. 19 is flow diagram of an example process 1900 for configuring applications using multilevel configuration. For example, process 1900 can be performed by news application 104 on user device 102. Process 1900 can be performed to dynamically generate configuration data for news application 104 based on a multilevel hierarchy of configuration data obtained from different and/or various sources.

At step 1902, user device 102 can receive an application level configuration for news application 104 on user device 102. For example, news application 104 can request application configuration data from news server 140. News application 104 can send a user identifier associated with the user in the request. News application 104 can receive the requested application configuration data from news server 140. The application configuration data can be generated by news server 140 based on user engagement segments associated with a user identifier associated with the user of user device 102.

At step 1904, user device 102 can obtain publisher level configuration for news application 104. For example, news application 104 can obtain the publisher level configuration from storage on user device 102 and/or from content server 910. For example, news application 104 can receive publisher level configuration data associated with a particular content publisher or provider when receiving content items associated with the particular content publisher. News application 104 can store the publisher level configuration on user device 102. Subsequently, when presenting content items associated with the particular publisher, news application 104 can obtain the publisher configuration data from storage (e.g., memory) on user device 102.

At step 1906, user device 102 can request a content item for news application 104. For example, news application 104 can receive user input selecting a content item that the user wishes to consume. News application 104 can send a request to content server 910 and/or news server 140 to obtain the content item.

At step 1908, user device 102 can receive the content item and content level configuration for news application 104. For example, news application 104 can receive the content item from content server 910 and/or news server 140 along with content level configuration data.

At step 1910, user device 102 can dynamically generate configuration data for news application 104 based on the application level configuration, the publisher level configuration, and the content level configuration. For example, news application 104 can combine the application level configuration, publisher level configuration, and content level configuration such that the content level configuration overrides or preempts the publisher level configuration and the publisher level configuration overrides or preempts the application level configuration.

At step 1912, user device 102 can obtain recommended content items to present with the requested content item based on the dynamic configuration data. For example, news application 104 can obtain recommended content items to present with the requested content item on a display of the user device based on the dynamic configuration data. For example, news application 104 can use the content selection rules specified in the application level configuration, publisher level configuration, and/or content level configuration to obtain and/or select content items to suggest to the user as the user is consuming the requested content item.

At step 1914, user device 102 can present the recommended content items with the requested content item based on the dynamic configuration data. For example, news application 104 can present the recommended or suggested content items as illustrated by FIG. 2, FIG. 3, and/or FIG. 12 above.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to improve the delivery and/or presentation of content to the users through news application 104. The present disclosure contemplates that in some instances, this gathered data may include personal information data that uniquely identifies or can be used to contact or locate a specific person. Such personal information data can include demographic data, location-based data, telephone numbers, email addresses, home addresses, data or records relating to a user's health or level of fitness (e.g., vital signs measurements, medication information, exercise information), date of birth, or any other identifying or personal information. The present disclosure recognizes that the use of such personal information data, in the present technology, can be used to the benefit of users. For example, the personal information data can be used to generate user engagement segments that can be used to improve the delivery and/or presentation of content to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user event data related to the use of news application 104, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading or invoking news application 104 (e.g., for the first time) that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), using anonymous user identifiers, and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to news application 104 and/or news server 140, or publicly available information.

Example System Architecture

Figure 20:
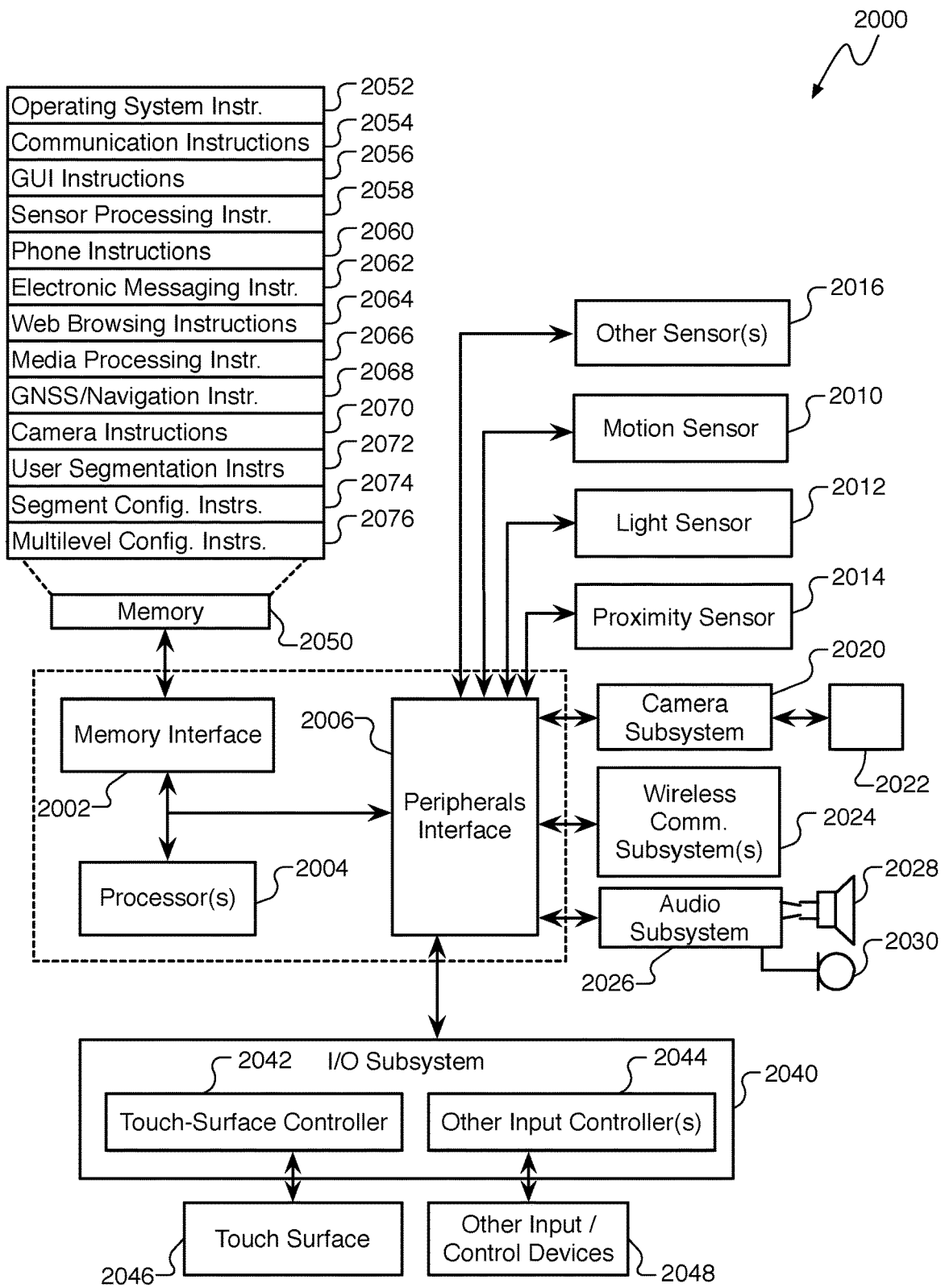
FIG. 20 is a block diagram of an example computing device that can implement the features and processes of FIGS. 1-19.

FIG. 20 is a block diagram of an example computing device 2000 that can implement the features and processes of FIGS. 1-19. The computing device 2000 can include a memory interface 2002, one or more data processors, image processors and/or central processing units 2004, and a peripherals interface 2006. The memory interface 2002, the one or more processors 2004 and/or the peripherals interface 2006 can be separate components or can be integrated in one or more integrated circuits. The various components in the computing device 2000 can be coupled by one or more communication buses or signal lines.

Sensors, devices, and subsystems can be coupled to the peripherals interface 2006 to facilitate multiple functionalities. For example, a motion sensor 2010, a light sensor 2012, and a proximity sensor 2014 can be coupled to the peripherals interface 2006 to facilitate orientation, lighting, and proximity functions. Other sensors 2016 can also be connected to the peripherals interface 2006, such as a global navigation satellite system (GNSS) (e.g., GPS receiver), a temperature sensor, a biometric sensor, magnetometer or other sensing device, to facilitate related functionalities.

A camera subsystem 2020 and an optical sensor 2022, e.g., a charged coupled device (CCD) or a complementary metal-oxide semiconductor (CMOS) optical sensor, can be utilized to facilitate camera functions, such as recording photographs and video clips. The camera subsystem 2020 and the optical sensor 2022 can be used to collect images of a user to be used during authentication of a user, e.g., by performing facial recognition analysis.

Communication functions can be facilitated through one or more wireless communication subsystems 2024, which can include radio frequency receivers and transmitters and/or optical (e.g., infrared) receivers and transmitters. The specific design and implementation of the communication subsystem 2024 can depend on the communication network(s) over which the computing device 2000 is intended to operate. For example, the computing device 2000 can include communication subsystems 2024 designed to operate over a GSM network, a GPRS network, an EDGE network, a Wi-Fi or WiMax network, and a Bluetooth™ network. In particular, the wireless communication subsystems 2024 can include hosting protocols such that the device 100 can be configured as a base station for other wireless devices.

An audio subsystem 2026 can be coupled to a speaker 2028 and a microphone 2030 to facilitate voice-enabled functions, such as speaker recognition, voice replication, digital recording, and telephony functions. The audio subsystem 2026 can be configured to facilitate processing voice commands, voiceprinting and voice authentication, for example.

The I/O subsystem 2040 can include a touch-surface controller 2042 and/or other input controller(s) 2044. The touch-surface controller 2042 can be coupled to a touch surface 2046. The touch surface 2046 and touch-surface controller 2042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2046.

The other input controller(s) 2044 can be coupled to other input/control devices 2048, such as one or more buttons, rocker switches, thumb-wheel, infrared port, USB port, and/or a pointer device such as a stylus. The one or more buttons (not shown) can include an up/down button for volume control of the speaker 2028 and/or the microphone 2030.

In one implementation, a pressing of the button for a first duration can disengage a lock of the touch surface 2046; and a pressing of the button for a second duration that is longer than the first duration can turn power to the computing device 2000 on or off. Pressing the button for a third duration can activate a voice control, or voice command, module that enables the user to speak commands into the microphone 2030 to cause the device to execute the spoken command. The user can customize a functionality of one or more of the buttons. The touch surface 2046 can, for example, also be used to implement virtual or soft buttons and/or a keyboard.

In some implementations, the computing device 2000 can present recorded audio and/or video files, such as MP3, AAC, and MPEG files. In some implementations, the computing device 2000 can include the functionality of an MP3 player, such as an iPod™.

The memory interface 2002 can be coupled to memory 2050. The memory 2050 can include high-speed random-access memory and/or non-volatile memory, such as one or more magnetic disk storage devices, one or more optical storage devices, and/or flash memory (e.g., NAND, NOR). The memory 2050 can store an operating system 2052, such as Darwin, RTXC, LINUX, UNIX, OS X, WINDOWS, or an embedded operating system such as VxWorks.

The operating system 2052 can include instructions for handling basic system services and for performing hardware dependent tasks. In some implementations, the operating system 2052 can be a kernel (e.g., UNIX kernel). In some implementations, the operating system 2052 can include instructions for performing voice authentication. For example, operating system 2052 can implement all or part of the user segmentation features, segment-based configuration features, and/or multilevel configuration features as described with reference to FIGS. 1-19.

The memory 2050 can also store communication instructions 2054 to facilitate communicating with one or more additional devices, one or more computers and/or one or more servers. The memory 2050 can include graphical user interface instructions 2056 to facilitate graphic user interface processing; sensor processing instructions 2058 to facilitate sensor-related processing and functions; phone instructions 2060 to facilitate phone-related processes and functions; electronic messaging instructions 2062 to facilitate electronic-messaging related processes and functions; web browsing instructions 2064 to facilitate web browsing-related processes and functions; media processing instructions 2066 to facilitate media processing-related processes and functions; GNSS/Navigation instructions 2068 to facilitate GNSS and navigation-related processes and instructions; and/or camera instructions 2070 to facilitate camera-related processes and functions.

The memory 2050 can store software instructions 2072, 2074, and/or 2076 to facilitate other processes and functions, such as the user segmentation features (2072), segment-based configuration features (2074), and/or multilevel configuration features (2076) processes and functions as described with reference to FIGS. 1-19.

The memory 2050 can also store other software instructions, such as web video instructions to facilitate web video-related processes and functions; and/or web shopping instructions to facilitate web shopping-related processes and functions. In some implementations, the media processing instructions 2066 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 2050 can include additional instructions or fewer instructions. Furthermore, various functions of the computing device 2000 can be implemented in hardware and/or in software, including in one or more signal processing and/or application specific integrated circuits.

What is claimed is:

1. A method comprising:
   receiving, by a server device from a plurality of user devices, user event data corresponding to user activity associated respectively with the plurality of user devices, the user activity constituting user engagement with content;
   defining, based on the user event data, a plurality of user engagement segments corresponding to respective levels of user engagement with the content;
   associating a particular user engagement segment, of the plurality of user engagement segments, with a first user based on a first user activity data corresponding to the first user; and
   configuring, by the server device, a first user device associated with the first user, based on the particular user engagement segment associated with the first user, wherein configuring the first user device comprises serving, by the server, application configuration data to an application executing on the first user device to configure the application to present content items corresponding to the particular user engagement segment based on the application configuration data served by the server.

2. The method of claim 1, wherein associating the particular user engagement segment with the first user based on the first user activity data comprises:
   determining engagement predictions for the first user based on the first user activity; and
   determining the particular user engagement segment based on the engagement predictions.

3. The method of claim 1, wherein configuring the first user device based on the particular user engagement segment comprises:
   generating the application configuration data based on the particular user engagement segment; and
   transmitting the application configuration data to the first user device.

4. The method of claim 1, wherein associating the particular user engagement segment with the first user based on the first user activity data comprises:
   determining an engagement lifecycle for the first user based on the first user activity data;
   selecting a prediction model based on the engagement lifecycle;
   generating a prediction score for the first user based on the prediction model; and
   selecting the particular user engagement segment based on the prediction score.

5. A system comprising:
   one or more processors; and
   a non-transitory computer readable medium including one or more sequences of instructions that, when executed by the one or more processors, cause the one or more processors to perform operations comprising:
   receiving, by a server device from a plurality of user devices, user event data corresponding to user activity associated respectively with the plurality of user devices, the user activity constituting user engagement with content;
   defining, based on the user event data, a plurality of user engagement segments corresponding to respective levels of user engagement with the content;
   associating a particular user engagement segment, of the plurality of user engagement segments, with a first user based on a first user activity data corresponding to the first user; and
   configuring, by the server device, a first user device associated with the first user, based on the particular user engagement segment associated with the first user, wherein configuring the first user device comprises serving, by the server, application configuration data to an application executing on the first user device to configure the application to present content items corresponding to the particular user engagement segment based on the application configuration data served by the server.

6. The system of claim 5, wherein associating the particular user engagement segment with the first user based on the first user activity data comprises:
   determining engagement predictions for the first user based on the first user activity; and
   determining the particular user engagement segment based on the engagement predictions.

7. The system of claim 5, wherein configuring the first user device based on the particular user engagement segment comprises:
   generating the application configuration data based on the particular user engagement segment; and
   transmitting the application configuration data to the first user device.

8. The system of claim 5, wherein associating the particular user engagement segment with the first user based on the first user activity data comprises:
   determining an engagement lifecycle for the first user based on the first user activity data;
   selecting a prediction model based on the engagement lifecycle;
   generating a prediction score for the first user based on the prediction model; and selecting the particular user engagement segment based on the prediction score.

9. A non-transitory computer readable medium including one or more sequences of instructions that, when executed by one or more processors, cause the one or more processors to perform operations comprising:
receiving, by a server device from a plurality of user devices, user event data corresponding to user activity associated respectively with the plurality of user devices, the user activity constituting user engagement with content;
defining, based on the user event data, a plurality of user engagement segments corresponding to respective levels of user engagement with the content;
associating a particular user engagement segment, of the plurality of user engagement segments, with a first user based on a first user activity data corresponding to the first user; and
configuring, by the server device, a first user device associated with the first user, based on the particular user engagement segment associated with the first user, wherein configuring the first user device comprises serving, by the server, application configuration data to an application executing on the first user device to configure the application to present content items corresponding to the particular user engagement segment based on the application configuration data served by the server.

10. The medium of claim 9, wherein associating the particular user engagement segment with the first user based on the first user activity data comprises:
determining engagement predictions for the first user based on the first user activity; and
determining the particular user engagement segment based on the engagement predictions.

11. The medium of claim 9, wherein configuring the first user device based on the particular user engagement segment comprises:
generating the application configuration data based on the particular user engagement segment; and
transmitting the application configuration data to the first user device.

12. The medium of claim 9, wherein associating the particular user engagement segment with the first user based on the first user activity data comprises:
determining an engagement lifecycle for the first user based on the first user activity data;
selecting a prediction model based on the engagement lifecycle;
generating a prediction score for the first user based on the prediction model; and
selecting the particular user engagement segment based on the prediction score.

13. The method of claim 1, wherein the user event data comprises information indicating at least one of: a launching of the application by a second user, suggested content items viewed by a second user, content items consumed by a second user, a number of content items consumed by a second user, an amount of time spent using the application by a second user, or a number of unique content items consumed by a second user.

14. The method of claim 1, wherein associating the particular user engagement segment, of the plurality of user engagement segments, with the first user based on the first user activity data corresponding to the first user further comprises:
determining, based on the first user activity data, that the first user initiated engagement with the application by performing one of: invoking the application directly, selecting a notification presented on a display, or selecting a content item represented on a graphical user interface.

15. The method of claim 14, wherein the application comprises an application adapted to provide one of news-related content or entertainment-related content.

16. The method of claim 1, wherein the particular user engagement segment comprises one of: a new user segment, an activated user segment, an adopted user segment, a churned user segment, a reactivated user segment, a low engaged user segment, a medium engaged user segment, and a highly engaged user segment.

* * * * *